(12) United States Patent  
Woodgate et al.

(10) Patent No.: US 8,390,914 B2
(45) Date of Patent: Mar. 5, 2013

(54) ILLUMINATION APPARATUS

(75) Inventors: Graham John Woodgate, Henley-on-Thames (GB); Jonathan Harrold, Warwick (GB)

(73) Assignee: Optovate Limited, Oxforshire (GB)

( * ) Notice: Subject to any disclaimer, the term of this patent is extended or adjusted under 35 U.S.C. 154(b) by 308 days.

(21) Appl. No.: 12/764,799

(22) Filed: Apr. 21, 2010

(65) Prior Publication Data

US 2010/0271684 A1    Oct. 28, 2010

(30) Foreign Application Priority Data

Apr. 25, 2009 (GB) .................................. 0907146.5
Nov. 16, 2009 (GB) .................................. 0919981.1

(51) Int. Cl.
*G02F 1/03* (2006.01)
*G02F 1/07* (2006.01)
(52) U.S. Cl. .................. 359/256; 359/245; 359/246
(58) Field of Classification Search .................. 359/237, 359/256

See application file for complete search history.

(56) References Cited

U.S. PATENT DOCUMENTS

| | | | |
|---|---|---|---|
| 5,122,903 A | 6/1992 | Aoyama et al. | |
| 6,547,423 B2 | 4/2003 | Marshall et al. | |
| 2002/0191128 A1 | 12/2002 | Okumura et al. | |
| 2006/0158511 A1 | 7/2006 | Harrold et al. | |
| 2006/0176541 A1* | 8/2006 | Woodgate et al. | ............ 359/237 |
| 2007/0008617 A1 | 1/2007 | Shestak et al. | |
| 2008/0284924 A1 | 11/2008 | Hofmann et al. | |

FOREIGN PATENT DOCUMENTS

| | | |
|---|---|---|
| EP | 1 750 459 A2 | 2/2007 |
| GB | 2 207 523 A | 2/1989 |
| GB | 2 403 815 A | 12/2006 |
| JP | 6082606 A | 3/1994 |
| JP | 2000171617 A | 6/2000 |
| JP | 2004340984 A | 12/2004 |
| JP | 2008040126 A | 2/2008 |
| WO | 98/21620 A1 | 5/1998 |
| WO | 03/015424 A2 | 2/2003 |
| WO | 2004070467 A2 | 8/2004 |
| WO | 2005006774 A1 | 1/2005 |

OTHER PUBLICATIONS

Great Britain Examination Report for BF0919981.1 Report Date Oct. 28, 2010.
GB Search Report and Examination for GB0919981.1 made on Aug. 7, 2010.
Commander, L.G., et al. "Electrode Designs for Tunable Mircolenses," European Optical Society Topical Meetings Digest Series: 13, May 15-16, 1997. pp. 48-58.
Great Britain Search Report for GB0907146.5 on May 21, 2009.

* cited by examiner

*Primary Examiner* — Ricky Mack
*Assistant Examiner* — Mahidere Sahle
(74) *Attorney, Agent, or Firm* — Ingrassia Fisher & Lorenz, P.C.

(57) ABSTRACT

A controllable light directional distributor for an illumination apparatus, and a method of manufacture of the same in which multiple elongate optical elements are arranged to provide controllable divergence angle from a light source with low divergence output angle.

17 Claims, 11 Drawing Sheets

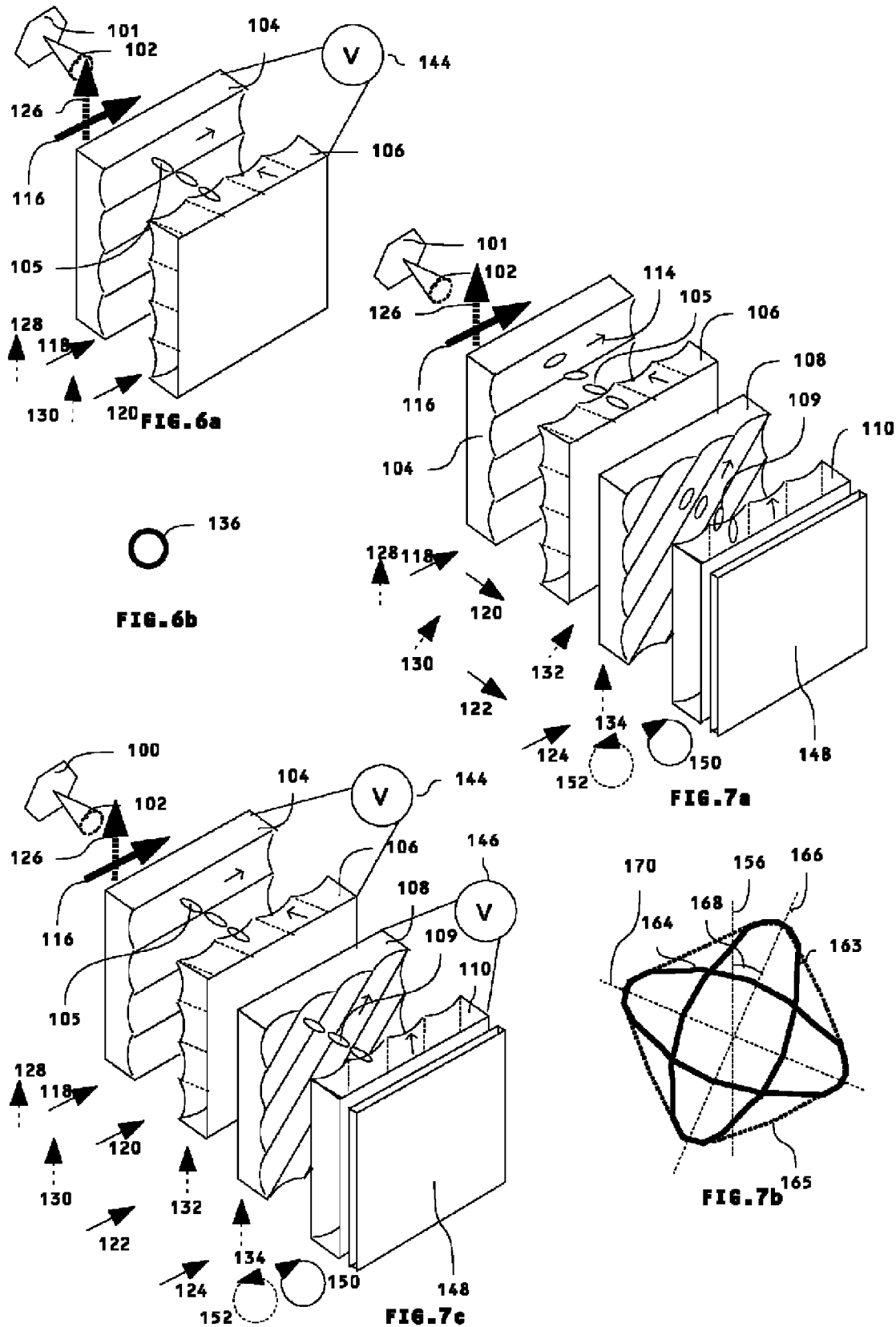

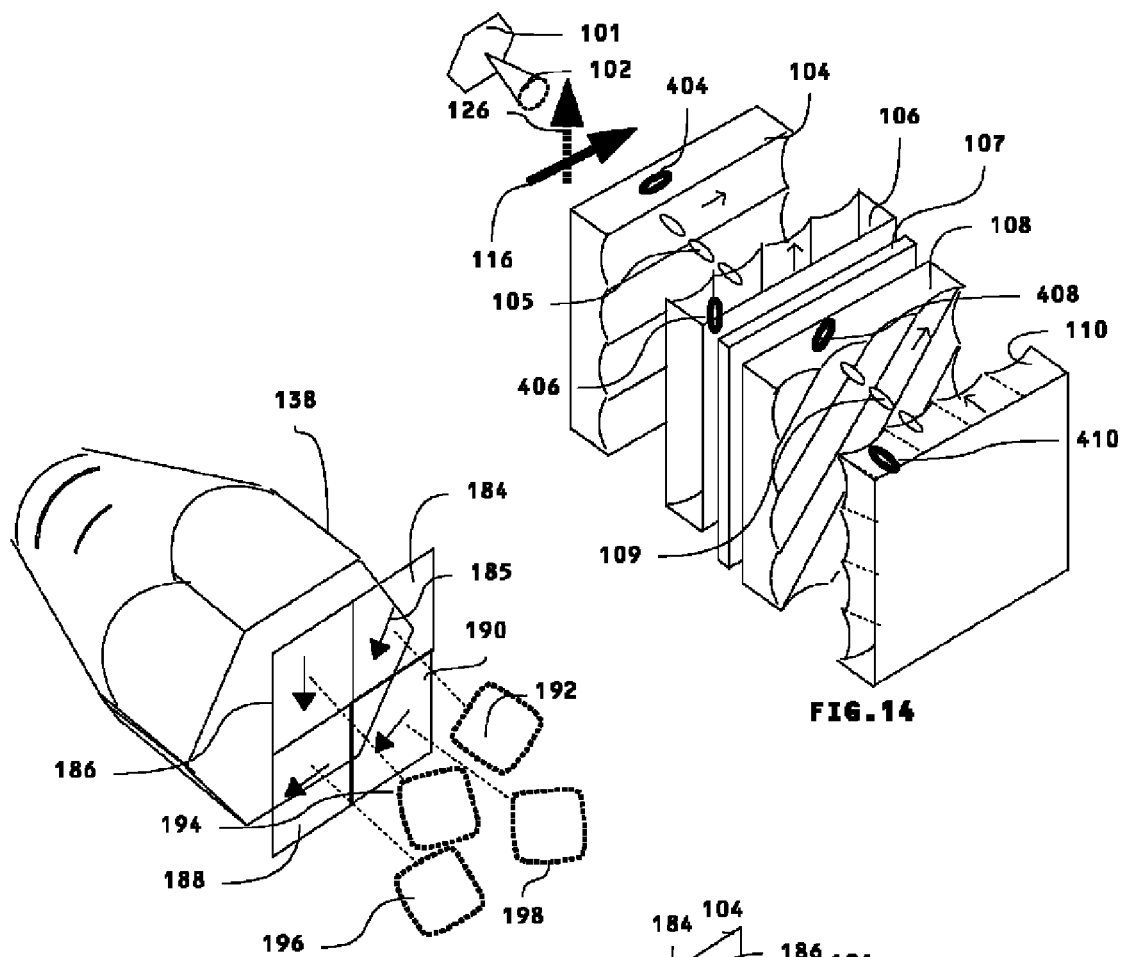
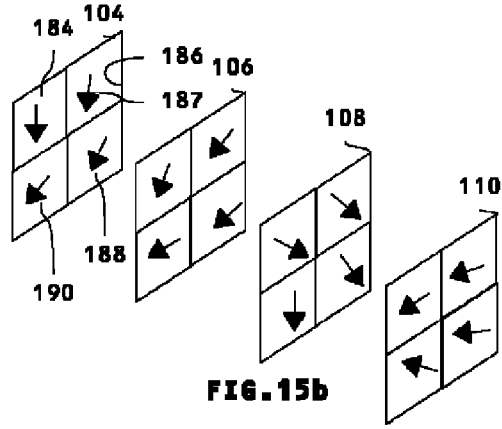
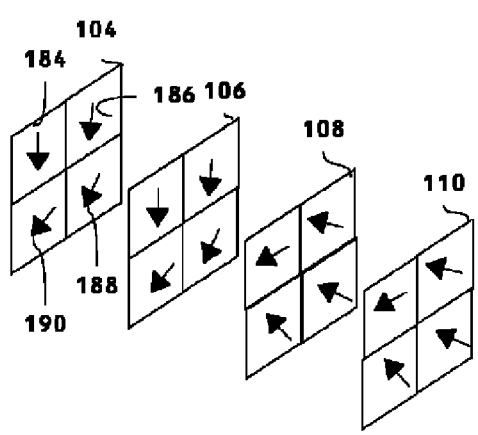
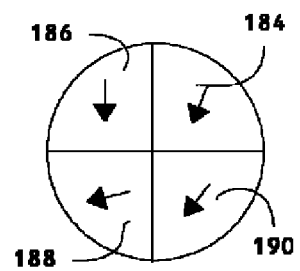
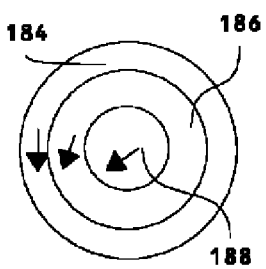

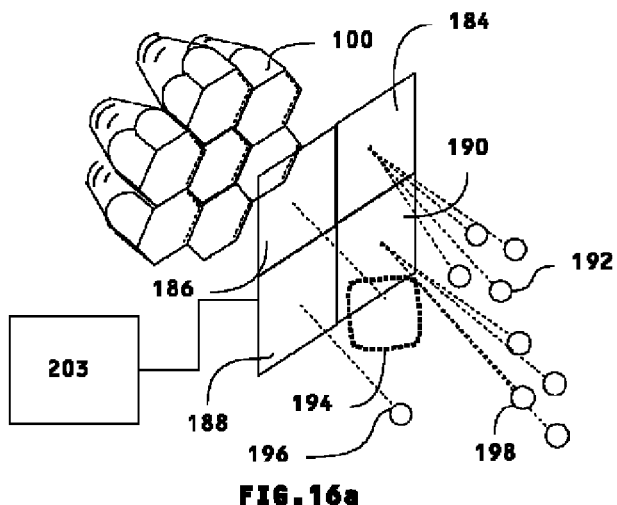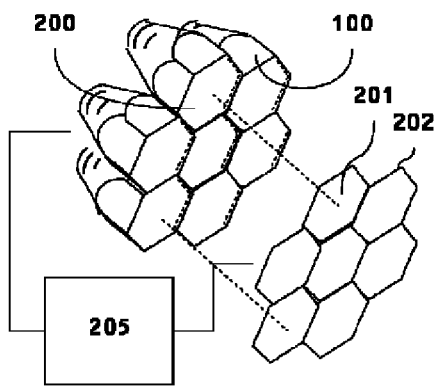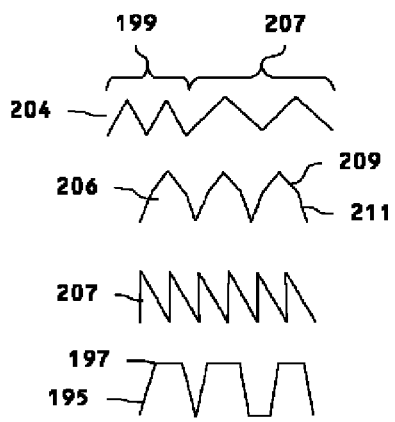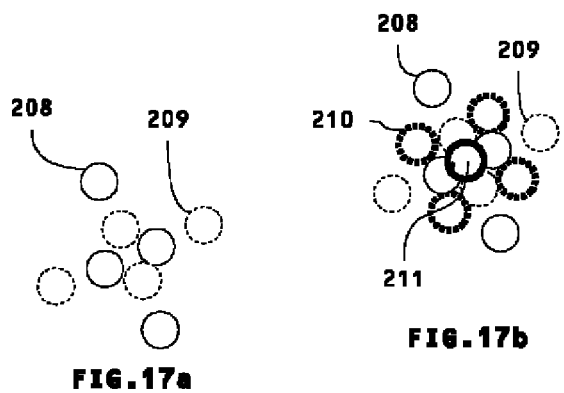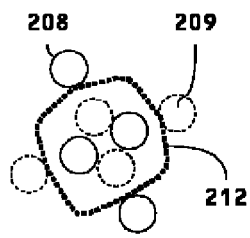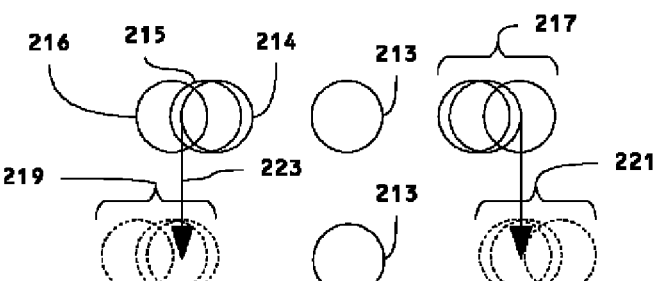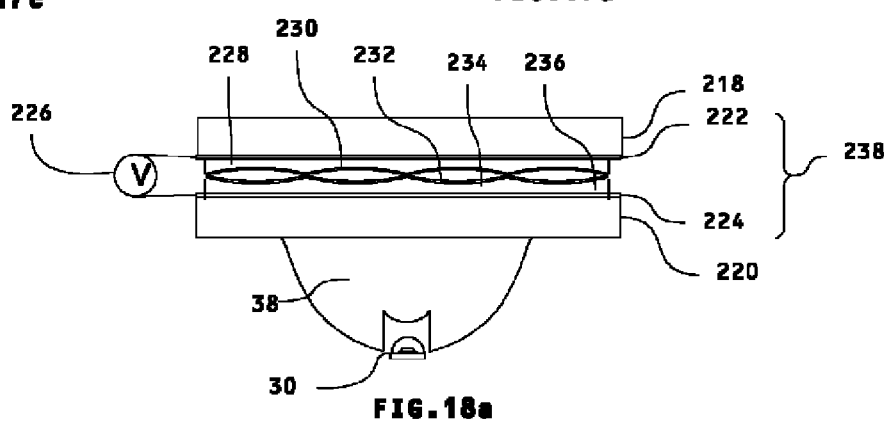

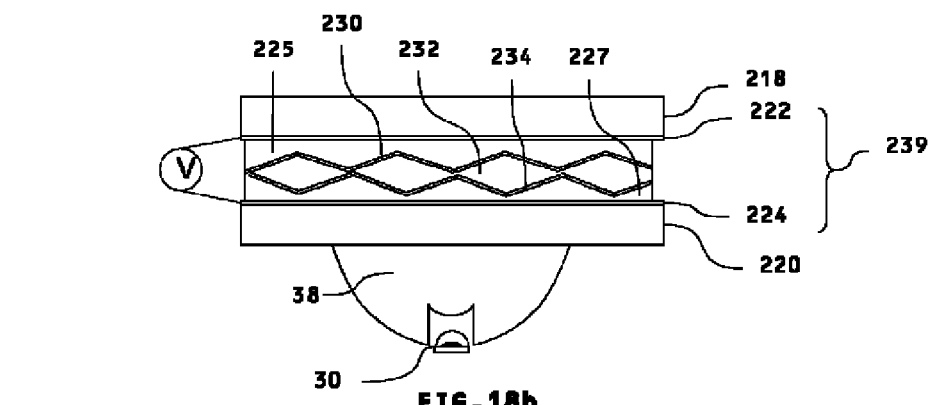
FIG.18b
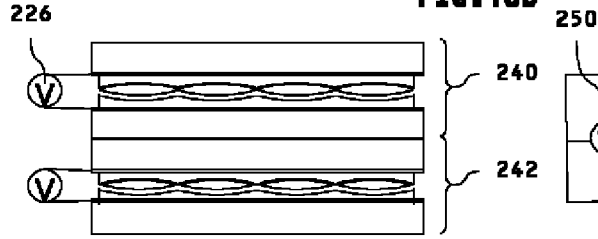
FIG.19a
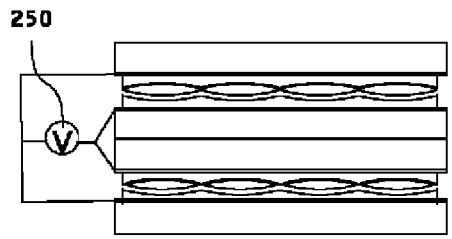
FIG.19b
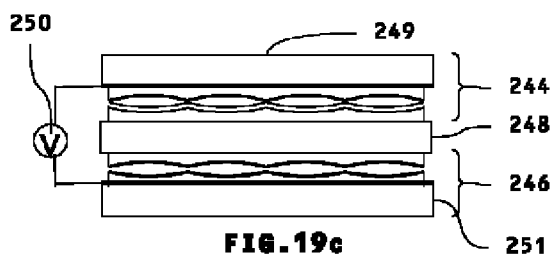
FIG.19c
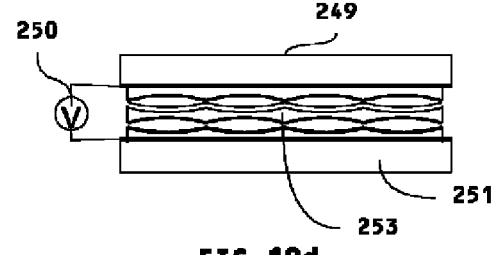
FIG.19d
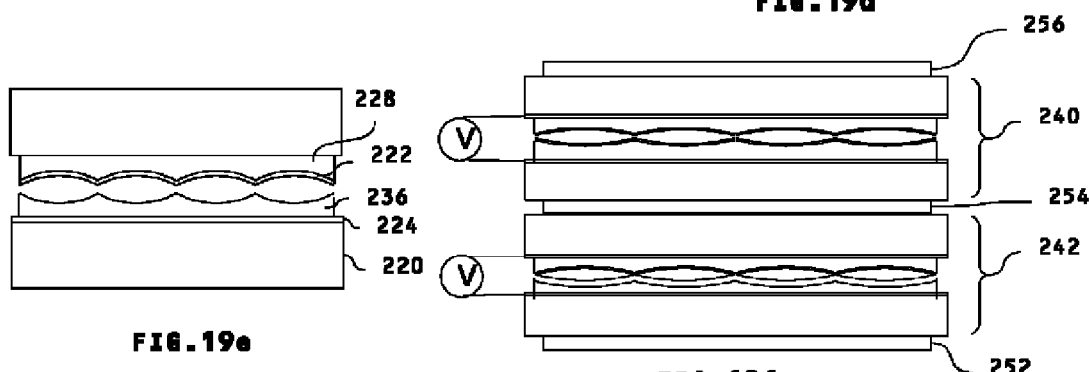
FIG.19e
FIG.19f
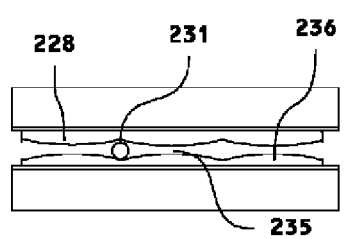
FIG.20a
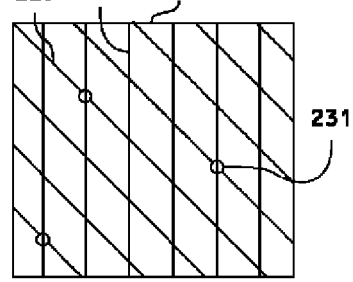
FIG.20b

ILLUMINATION APPARATUS

CROSS-REFERENCE TO RELATED APPLICATIONS

This application claims the benefit of British Patent Application No. GB0907146.5, filed Apr. 25, 2009, and British Patent Application No. GB0919981.1, filed Nov. 16, 2009, which are both hereby incorporated in their entirety by reference.

TECHNICAL FIELD

The present invention relates to illumination apparatus, for example (but not limited to) ceiling lights, wall lights, cabinet lights, torches, automotive lights, architectural lights, medical lights and so on, where the illumination apparatus is used to illuminate an area or a volume.

BACKGROUND

Incandescent light sources produce a near black-body optical spectrum. However, such light sources tend to have relatively low efficiency, and are relatively large requiring large light fittings, particularly if a low divergence angle is required for the light output. High intensity discharge lamps are capable of producing high luminous flux from small arc sources. Such sources are suitable for projectors and directional illumination but are bulky and have relatively low efficiency. Fluorescent lamps have improved efficiency compared to incandescent sources, but suffer from a large source size.

Light-emitting diodes (LEDs) formed on monolithic wafers (wafers consisting of a single piece) can demonstrate high efficiency with acceptable CIE Color Rendering Indices (CRI). Organic light-emitting Diodes (OLEDs) can be formed on arbitrarily large substrates but may have lower optical output per unit area compared to wafer type LEDs, which may limit their efficiency in directional lighting.

Illumination apparatus, including for example (but not limited to) ceiling lights, wall lights, cabinet lights, torches, automotive lights, architectural lights, medical lights and so on, is used to illuminate an area or a volume, so that the light can illuminate items in that area or volume, so that those items can be viewed by a person. This is distinct from display technology e.g. three dimensional (3-D) display technology and in particular autostereoscopic 3-D display technology (in which no viewing aids are required), where light is directed from display elements to different eyes so that the display elements themselves can be seen directly by a person.

In lighting applications, light from an emitter is directed using a luminaire to provide the required directionality. The angular variation of intensity (or luminance) is termed the directional distribution, which produces a light radiation (illuminance) pattern, or 'spot' on surfaces and is configured for a particular application. Lambertian emitters enable light to flood a room with light. Such use of light can be inefficient as the light is distributed to regions that may not require illumination, and can be perceived as a wasteful and visually undesirable illumination source. Lambertian emitters can be perceived as providing flat lighting lacking in sparkle which is unattractive. Further, Lambertian emitters produce high levels of source glare, so that an observer will see the light source from a wide range of angles with high luminance, providing visual discomfort.

Non-Lambertian, directional light sources use a relatively small source size lamp such as a tungsten halogen type in a reflector and/or reflective tube luminaire, in order to provide a more directed source. Such lamps enable efficient use of the light by directing it to areas of importance. These lamps produce higher levels of visual sparkle, in which the small source provides specular reflection artifacts, giving a more attractive illumination. Further, the source glare can be reduced, as the output aperture of the light source is directly visible only from a small range of angles.

To further enhance usage efficiency, it would be desirable to adjust the directionality of directional light sources to meet the lighting requirements of an environment. For conventional directional lamps, this is typically determined by the design of the reflector optical elements and the pointing direction of the lamp during installation. An adjustment of pointing direction often adds cost requiring gimbal type mounts and can often be difficult to adjust because of the location and surface temperature of the lamp. The directionality of the lamp is typically set once by design choice. To deal with the changing usage patterns in the room, multiple directional lamps are installed giving an inefficient over-illumination of a room. For example, it might be advantageous to use broad Lambertian illumination in the daytime to supplement natural lighting, while in the evenings, it might be preferred to use more directional spot lighting. In another example, it may be desirable to achieve more rapidly time varying lighting effects by varying the structure of arrays of lights illuminating a surface so as to provide visual impact.

Directional LED elements can use catadioptric optic type reflectors combining refractive and total internal reflector elements, as described for example in U.S. Pat. No. 6,547,423. A known catadioptric optic system is capable of producing a light beam with a 6 degree divergence angle from a 1×1 mm light source, with an optical element with 15 mm final output diameter. The increase in source size arises for conservation of brightness (etendue) reasons. This element provides optimum efficiency for an LED positioned in the input aperture of the device. Adjusting the separation of the LED from the input aperture may change the output divergence angle somewhat, but can also reduce collection efficiency. Further, this may require mechanical adjustments that are difficult to control at low cost and are unreliable over the lifetime of the lamp.

It is therefore desirable to add a means to adjust the directionality of the light in response to an applied electrical signal. This would achieve more efficient illumination of an environment to suit the needs of users.

Electrically switchable birefringment liquid crystal microlenses are described in European Optical Society Topical Meetings Digest Series: 13, 15-16 May 1997 L. G. Commander et al "Electrode designs for tunable microlenses" pp 48-58. Circular liquid crystal microlenses provide variable directionality in two axes but are difficult to provide with uniform alignment orientation by conventional alignment layer processing methods. Further, such lenses suffer from liquid crystal alignment disclinations which can degrade the performance of the lens in switched and unswitched states.

Switchable 2D-3D displays using a switchable lenticular lens array are described in WO 98/21620, WO 03/015424, WO2004/070467, WO2005/006774, and US20070008617. Autostereoscopic displays comprising switchable lenticular arrays image arrays of pixels to viewing windows. An observer positions their eyes within the viewing window and looks directly at the autostereoscopic display. In the case of lenticular displays, the observer thus looks directly at the lenticular elements. The switchable lenticular elements are switchable between a 2D mode in which the full panel resolution can be observed in which no autostereoscopic viewing windows are produced and a 3D mode in which the autostereoscopic viewing windows are produced. In an illumination system, an observer does not look directly at a light source due to its high brightness; rather the observer sees light reflected and scattered from other surfaces. US20080284924 describes a projection apparatus for a lighting system comprising at least one liquid crystal optical element.

Switchable diffusers using polymer dispersed liquid crystals encapsulated in polymeric material are known. Such elements typically suffer from high levels of back scatter and thus low optical efficiency and are not suited to efficient lighting systems with controllable directionality.

SUMMARY

According to a first aspect of the present invention there is provided a controllable light directional distributor for an illumination apparatus, comprising a first optical structure comprising a first plurality of elongate elements on a first surface of the first optical structure; a second optical structure comprising a second plurality of elongate elements on a first surface of the second optical structure; the first optical structure and the second optical structure being positioned in series with the first surface of the first optical structure and the first surface of the second optical structure facing each other; a first layer of electrically controllable birefringent material whose director orientation is electrically controllable positioned between the first optical structure and the second optical structure; such that a surface profile of a first surface of the first layer of electrically controllable birefringent material is defined at least in part by the surface profile of the elongate elements of the first optical structure and such that a surface profile of a second surface of the first layer of electrically controllable birefringent material is defined at least in part by the surface profile of the elongate elements of the second optical structure; and electrodes positioned so as to provide electrical control of the director orientation of the first layer of electrically controllable birefringent material; wherein the respective refractive indices of the first optical structure, the first layer of electrically controllable birefringent material and the second optical structure are such that for incident light of a first polarization the first optical structure and first layer of electrically controllable birefringent material cooperate to control the light directional distribution; and for incident light of the first polarization the second optical structure and first layer of electrically controllable birefringent material cooperate to further control the light directional distribution.

The electrically controllable birefringent material may be a liquid crystal material with an ordinary refractive index and an extraordinary refractive index; and alignment layers may be formed on the respective first surfaces of the first and second optical structures; wherein the director orientation of the liquid crystal material is aligned substantially parallel to the orientation of the respective geometric axes of the elongate elements on the first surface of the first optical structure and is aligned substantially parallel to the orientation of the respective geometric axes of the elongate elements on the first surface of the second optical structure. The respective refractive indices of the first optical structure and the second optical structure may be substantially the same as one of the ordinary and extraordinary refractive indices of the electrically controllable birefringent material. The first optical structure and the second optical structure may be formed with isotropic material. At least one of the first optical structure and the second optical structure may be formed with cured liquid crystal material. The director of the cured liquid crystal material may be aligned substantially parallel to the orientation of the geometric axes of the respective elongate elements.

The orientations of geometric axes of the respective elongate elements of the respective first and second optical structures may be different. At least one optical structure may have at least a first region with a first orientation of geometric axes of elongate elements and at least a second region with a second orientation of geometric axes of elongate elements, different from the first orientation. First and second optical structures may comprise at least first and second regions of geometric axes of elongate elements; and the first region of the first optical structure may be aligned to the first region of the second optical structure. Each region of the first optical structure may be aligned to each respective region of the second optical structure; wherein the difference in orientation of the respective geometric axes of elongate elements of respective first and second optical structures within each respective region may be the same for all respective aligned regions of the first and second optical structures.

The controllable light directional distributor for an illumination apparatus may further comprise a third optical structure comprising a third plurality of elongate elements on a first surface of the third optical structure; a fourth optical structure comprising a fourth plurality of elongate elements on a first surface of the fourth optical structure; the third optical structure and the fourth optical structure being positioned in series with the first surface of the third optical structure and the first surface of the fourth optical structure facing each other; a second layer of electrically controllable birefringent material whose director orientation is electrically controllable positioned between the third optical structure and the fourth optical structure; such that a surface profile of a first surface of the second layer of electrically controllable birefringent material is defined at least in part by the surface profile of the elongate elements of the third optical structure and such that a surface profile of a second surface of the second layer of electrically controllable birefringent material is defined at least in part by the surface profile of the elongate elements of the fourth optical structure; wherein the third and fourth optical structures are arranged in series with the first and second optical structures. The controllable light directional distributor for an illumination apparatus may further comprise electrodes positioned so as to provide electric control of the director orientation of the second layer of electrically controllable birefringent material. The electrodes may be electrode layers positioned so as to provide electric control of the director orientation of the first and second layers of electrically controllable birefringent material. The second and third optical structures may be positioned in series between the first and second layers of electrically controllable birefringent material; the second optical structure may have at least a first region with a first orientation of geometric axes of respective elongate elements and the third optical structure may have at least a first region with a second orientation of geometric axes of respective elongate elements; wherein the respective first regions of the second and third optical structures are aligned; the respective elongate elements of the second and third optical structures are arranged such that the first orientation of the geometric axes is orthogonal to the second orientation of the geometric axes.

At least some of the elongate elements may comprise prismatic elements. At least some of the elongate elements may comprise lenticular lens elements.

According to a second aspect of the present invention there is provided an illumination apparatus comprising a controllable light directional distributor according to the first aspect; further comprising at least one light emitting element and an aligned optical element wherein the optical element directs light emitted by the light-emitting element into a smaller solid angle than that at which the light is emitted by the light-emitting element.

According to a third aspect of the present invention there is provided a method of manufacturing a controllable light directional distributor apparatus for an illumination apparatus; the method comprising the steps of: forming at least one optical structure wherein at least two regions of elongate elements are formed on a first surface of the optical structure, each region comprising a different orientation of geometric axes of elongate elements; forming an alignment layer on the surface of the optical structures; masking the regions so that only regions with a common orientation of geometric axes of elongate elements are not masked; rubbing the regions that are not masked in a direction parallel to the orientation of the geometric axes of the elongate elements in the respective region; repeating the masking and rubbing wherein each respective region is rubbed in a direction parallel to the respective geometric axes; assembling first and second optical structures such that respective regions are substantially aligned between first and second optical structures; filling with liquid crystal material; and sealing, cutting and attachment of electrode contacts.

According to a fourth aspect of the present invention there is provided a controllable light directional distributor for an illumination apparatus, comprising: a first optical structure comprising at least a first plurality of elongate elements on a first surface of the first optical structure; a second optical structure with a first surface; wherein at least one of the first and second optical structures further comprises at least a second plurality of elongate elements on the first surface of the respective first or second optical structures wherein the first and second plurality of elongate optical elements are different; the first optical structure and the second optical structure being positioned in series with the first surface of the first optical structure and the first surface of the second optical structure facing each other; a first layer of electrically controllable birefringent material whose director orientation is electrically controllable positioned between the first optical structure and the second optical structure; such that a surface profile of a first surface of the first layer of electrically controllable birefringent material is defined at least in part by the surface profile of the elongate elements of the first optical structure and such that a surface profile of a second surface of the first layer of electrically controllable birefringent material is defined at least in part by the surface profile of the second optical structure; and electrodes positioned so as to provide electrical control of the director orientation of the first layer of electrically controllable birefringent material; wherein the respective refractive indices of the first optical structure and the first layer of electrically controllable birefringent material are such that for incident light of a first polarization the first plurality of elongate elements and first layer of electrically controllable birefringent material cooperate to control the light directional distribution; and for incident light of the first polarization the second plurality of optical elements and first layer of electrically controllable birefringent material cooperate to control the light directional distribution. The first and second pluralities of elongate elements may be on the first surface of a first optical structure.

It is the purpose of embodiments of the present invention to provide electrically controlled modification of the divergence angle of low divergence output angle light sources with high optical efficiency. By way of comparison, switchable diffusers such as polymer dispersed liquid crystals suffer from low efficiency due to back scatter. In particular, it is the purpose of embodiments of the present invention to provide high divergence angle from switchable birefringent elongate optical elements using known materials and surface structures. Known materials have limited ranges of birefringence, for example a maximum birefringence of 0.3. This limits the optical power of a single surface, and thus the maximum divergence angle that such a surface can apply to a low divergence angle input beam. In embodiments of the present invention, advantageously multiple surfaces are arranged to increase the divergence angle and symmetry of beam shape that can be achieved. Further, the structures may achieve modulation of all polarization states and substantially symmetric beam divergence angles to be achieved so that the device has high switching efficiency at low cost.

This can be used to adjust the distribution of light to suit the changing usage of the environment. For example, advantageously the lighting can be conveniently adjusted between spot lighting for location specific activities and wider angle lighting for general illumination. This may achieve a reduction in the total lighting power consumption, thus increasing the overall system lighting efficiency.

An optical structure may comprise a plurality of elongate elements on a surface of the optical structure. Lenticular lens elements formed on a surface are one form of elongate elements used to form an optical structure comprising elongate (considerably longer in one dimension than another) elements. Lenticular lenses have a curvature about a single axis, while microlens surfaces have curvature about more than a single axis. Elongate prism structures are one other form of an optical structure comprising elongate elements. The elongate elements may further comprise other structures such as elongate diffraction elements and combinations of curvature, prismatic and diffractive structures. In the plane of the optical structure, the element dimension may be greater than three times greater in one dimension than the other. Preferably, the element is structured about one axis and unstructured about the orthogonal axis (such as a cylindrical lens or a one dimensional prism) The elongate elements may be parallel across at least a region of the array, or may have a variable axis direction so that adjacent elements are parallel but regions across the array are not parallel.

A switchable stack of at least four birefringent surfaces comprising elongate elements (each pair of which operate for a single polarization state) advantageously cooperate to provide higher optical power, symmetrical beam shape and lower cost than two birefringent microlens surfaces. Birefringent liquid crystal components formed using liquid crystal materials typically use an alignment surface. Such an alignment surface can comprise rubbed polyimide for example. By way of comparison, physical features in the surface of surface relief non-elongate structures can degrade the alignment quality by deflecting the angle of the fibers of the rubbing cloth as they brush across the surface. Thus, the alignment may be non-uniform across the element surface and the output of the switchable lens may be degraded. The device may produce illumination hot-spots, suffer from scatter and may have reduced optical power. In embodiments comprising elongate electrode structures arranged to provide graded index liquid crystal profiles, advantageously elongate electrodes can achieve convenient electrical connection across a plurality of elements with high area efficiency.

Advantageously lenticular lens elements and elongate prism elements have an elongate geometrical axis and so rubbing uniformity and liquid crystal disclinations can be optimized if the surfaces are rubbed parallel to the elongate surfaces. Such elements have high optical efficiency and low levels of scatter. Embodiments of this invention provide a switching illumination apparatus comprising at least two different orientations of geometric axes of elongate elements within a single birefringent elongate element stack so as to provide increased optical power and output beam symmetry compared to a single elongate element while providing high quality alignment of liquid crystal materials within the birefringent optical structure. Embodiments further provide at least four different elongate element optical structures which cooperate so that light of both polarization states may be used to provide a wider range of illumination sub-structures. This increases the uniformity of the source and increases the number of different illumination structures that can be achieved. To avoid the effects of polarization sensitive reflections, advantageously a further quarter waveplate may be inserted at the output.

In order to further increase spot uniformity, such devices can be patterned such that the orientation of the illumination structure is different for different regions. Advantageously the elongate element devices have a rotational alignment and do not require precision lateral positional alignment so that the devices are cheaper to manufacture as they do not require an accurate alignment step.

To control the divergence of the birefringent elongate optical elements, transparent addressing electrodes for applying an electric field may be provided. Connection to addressing electrodes may also be arranged so that the final output may be modulated to provide a time varying and/or spatially variation illumination structure. In this manner, aesthetic modifications can advantageously be made to the final illumination structure. Further, the divergence angle over different parts of the light source can be adjusted to provide different illumination sub-structures.

Illumination sources have a defined illumination structure which is typically, but not necessarily, circularly symmetric. When applied to such sources, elongate elements in isolation provide an output which has the same divergence angle as the source in one axis and an increased divergence angle for lenticular lenses, or beam deflection angle for prisms in the orthogonal axis. Thus such elements produce broadly elliptically shaped outputs for a circularly symmetric input beam. Advantageously, embodiments of the present invention achieve substantially circularly symmetric output using elongate lenticular lens elements or elongate prismatic elements.

Further the symmetry of the output illumination can be varied by adjusting the relative proportion of the light in each illumination sub-structure. Such an arrangement can be used advantageously in directional wall washing or wall grazing illumination systems.

The illumination apparatus embodiments of the present invention advantageously provide singly, or in combination: adjustable divergence angle illumination; high divergence angle with known materials; low luminaire cost; substantially circularly symmetric output; increased range of divergence angle from standard materials and lens or prism sags; does not require tight tolerance lateral alignment of multiple lens or prism arrays; high optical efficiency; low liquid crystal disclination density; compatibility with LCD manufacturing equipment and methods; reduced number of optical components in the stack; broad spectral range; and reduced light source glare.

BRIEF DESCRIPTION OF THE DRAWINGS

Embodiments of the present invention will now be described, by way of example only, with reference to the accompanying drawings in which:

FIG. 5b shows the output illumination structure of FIG. 5a;

FIG. 6a shows the switching of the apparatus of FIG. 5a;

FIG. 6b shows the output illumination structure of FIG. 6a and FIG. 7c;

FIG. 7a shows a further illumination apparatus comprising birefringent elongate element optical structures;

FIG. 7b shows the output illumination structure of FIG. 7a;

FIG. 7c shows the switching of the apparatus of FIG. 7a;

FIG. 9b shows the output illumination structure of FIG. 9a;

FIG. 10b shows the output illumination structure of FIG. 10a;

FIG. 14 shows a further illumination apparatus comprising birefringent non-switching layers;

FIG. 15a shows a further illumination apparatus comprising an array of birefringent elongate element stacks;

FIG. 15b shows one structure of the regions of the array of birefringent elongate element stacks of FIG. 15a;

FIG. 15c shows a further structure of the regions of the array of birefringent elongate element stacks of FIG. 15a;

FIG. 15d shows a further structure of the regions of the array of birefringent elongate element stacks of FIG. 15a;

FIG. 15e shows a further structure of the regions of the array of birefringent elongate element stacks of FIG. 15a;

FIG. 16a shows a further illumination apparatus comprising an array of birefringent elongate element stacks;

FIG. 16b shows a further illumination apparatus comprising an array of birefringent elongate element stacks;

FIG. 16c shows cross sections for elongate elements;

FIG. 17a shows a spot distribution;

FIG. 17b shows a further spot distribution;

FIG. 17c shows a further spot distribution;

FIG. 17d shows a spot distribution embodiment to reduce the appearance of chromatic aberrations;

FIG. 18a shows in cross section an illumination apparatus comprising birefringent elongate element stacks;

FIG. 18b shows in cross section an illumination apparatus comprising birefringent prism stacks;

FIG. 19a shows in cross section a further birefringent elongate element stack;

FIG. 19b shows in cross section a further birefringent elongate element stack;

FIG. 19c shows in cross section a further birefringent elongate element stack;

FIG. 19d shows in cross section a further birefringent elongate element stack;

FIG. 19e shows in cross section a further birefringent elongate element stack;

FIG. 19f shows in cross section a further birefringent elongate element stack;

FIG. 20a shows in cross section a birefringent elongate element stack and spacer element;

FIG. 20b shows in plan view a birefringent elongate element stack and spacer element;

FIG. 30b shows the output illumination structure of FIG. 30a;

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
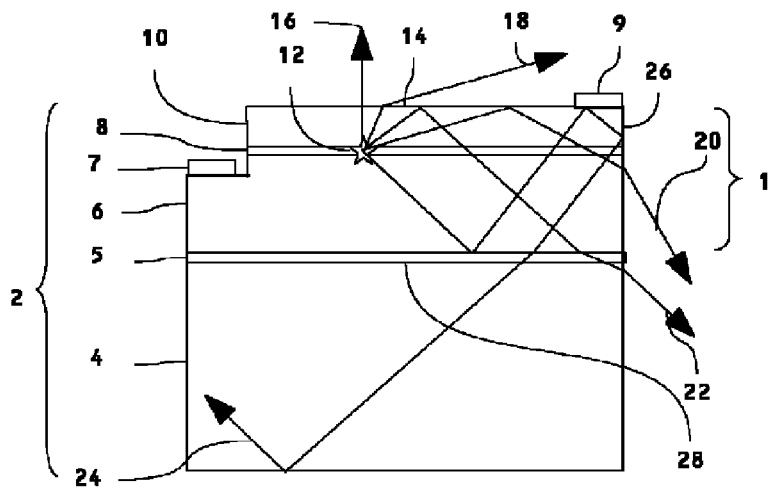
FIG. 1 shows a prior art LED device.

A known Light Emitting Diode, LED device 2 is shown in FIG. 1. A substrate 4, such as sapphire has an n-type Gallium Nitride layer 6 formed on its surface, typically with intermediate functional layer 5 such as a lattice matching layer or a release layer. A multiple quantum well layer 8 and p-type GaN layer 10 are formed over the substrate 6. The active layer 1 comprises the layers 6,8,10 and perhaps part of layer 5 and may further comprise electrode contacts and other functional elements as part of the LED structure.

In this specification, the term LED is used to include semiconductor LEDs including inorganic LED, organic LEDs and polymer LEDs. When a field is applied across the device by means of electrodes 7, 9, emission 12 occurs within the layer 8. Light rays 16, 18 transmitted close to normal to the outer surface 14 are transmitted. However, light rays 20, 22, 24 are internally reflected due to the relatively high refractive indices within the device 2. Light rays 20, 22 can exit through the edge 26 of the device. To improve the external efficiency, surface roughening or photonic bandgap structures are added to the top surface 14. In thin film flip chip devices, the substrate 4 is removed to improve external light coupling. In this case, the surface 28 is modified. The optical output of such devices is typically substantially Lambertian. Alternatively, at least one surface of the LED device 2 may have a further photonic bandgap structure to advantageously provide output directionality of output without additional optical elements.

Figure 2:
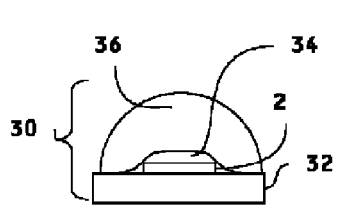
FIG. 2 shows an LED device mounted with phosphor and lens layers.

FIG. 2 shows a packaged LED 30 in which the device 2 is mounted onto a substrate 32. Electrical connections (not shown) are made and in the case of white emission devices, a phosphor layer 34 is added. Further, a hemispherical structure 36 is added that increases output coupling efficiency from the LED at the expense of increased source etendue. The packaged LED 30 can have relatively high luminance with a substantially Lambertian output. Disadvantageously, the light may not be efficiently directed for a particular lighting environment. In particular, it is often desirable that the light emitted by the LED 2 or packaged LED 30 is directed into a smaller solid angle than that at which the light is emitted by the LED 2 or packaged LED 30.

Figure 3:
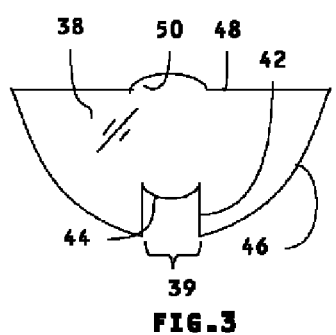
FIG. 3 shows a catadioptric optic device.
Figure 4:
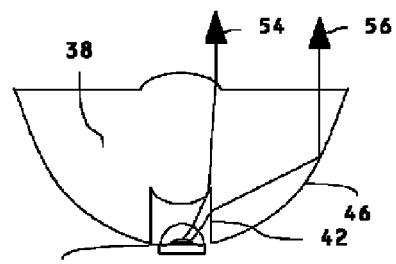
FIG. 4 shows a directional LED device.

FIG. 3 shows a known catadioptric light directing optical element 38 comprising a physical input aperture 39, input walls 42, lens surface 44, reflective surface 46, and front surface 48. Surface 48 may comprise several features. For example, a lens surface 50, a diffuser, lenticular arrays or other optical function may be incorporated. FIG. 4 shows the operation of the light directing element 38 with the device 30. Light ray 54 passes through the lens surface 44 and reflective surface 50 and is directed parallel to the optical axis 52. Light ray 56 passes through the surface 42 and undergoes total internal reflection at the surface 46. Alternatively the surface 46 may be coated with a reflective material. The output of the catadioptric element 38 has a directional distribution with a smaller solid angle and thus lower divergence angle than the input Lambertian illumination from the packaged LED 30. The catadioptric array comprises refractive and reflective regions; alternatively the catadioptric array could be replaced by a reflective collimating optic array.

The divergence angle (or cone angle, or beam angle) in a given plane of a light beam is defined by the extent of the light source and optics, typically in the far field of the light source. For example, a beam may have a rotationally symmetric divergence angle of 6 degrees; defining the half angle at which the luminance drops to 50% of the nominal peak luminance. The illumination spot is the illuminance function on a surface orthogonal to the nominal propagation direction of the beam. The spot shape may be illustrated as the locus of the 50% peak illuminance points in the illumination spot. The light divergence angle may be rotationally symmetric such that a circular spot shape is produced; or may be rotationally asymmetric, for example square or elliptical. Alternatively the spot may have a more complex sub-structure.

Figure 5A:
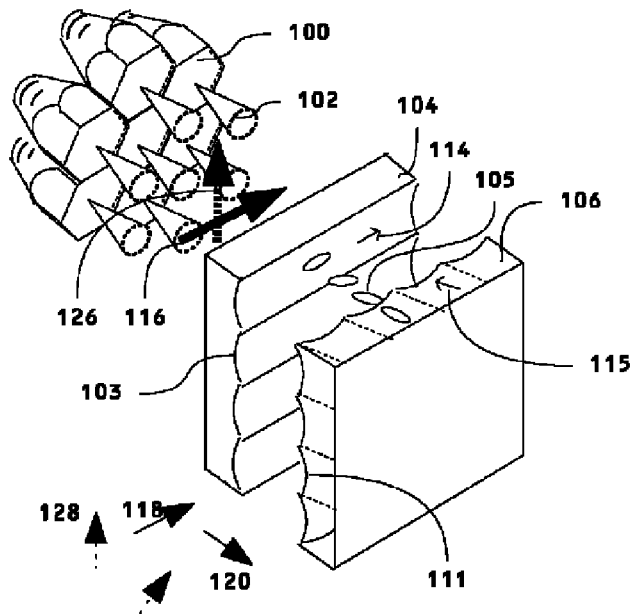
FIG. 5a shows a first illumination apparatus comprising birefringent elongate element optical structures.

In a first embodiment a controllable light directional distributor for an illumination apparatus is shown in FIG. 5a. A low divergence angle (i.e. low solid angle) light source array 100 comprising arrays of light sources and catadioptric elements arranged to provide substantially circularly symmetric output light beams 102. A first optical structure 104 comprises a first plurality of surface relief elongate elements 103 on a first surface of the first optical structure 104 in which the surface profiles of the respective elongate elements are lenticular lens surface profiles. The optical structure 104 is formed from an isotropic material with the plurality of elongate elements 103 on a first surface with orientation of geometric axes arranged at 0 degrees. A second optical structure 106 comprises a second plurality of surface relief elongate elements 111 on a first surface of the second optical structure 106 in which the surface profile of the plurality of elongate elements has a lenticular lens profile. The second lenticular lens structure is formed in series with structure 104 and may be of substantially the same material.

In this disclosure, the orientation of the geometric axis of an elongate element is defined as the direction parallel to a cusp (or locus of high points) of the respective elongate elements. A lenticular lens profile is one embodiment of surface profile of elongate optical structures. The surface profiles of the elongate elements in cross section may for example be spherical, parabolic, prismatic, have flat regions and may be the same for all elements, or may be some combination of surface profiles across the plurality of elongate elements or across a single elongate element. The surface profile may additionally have some randomized structure so as to advantageously achieve a more diffuse output illumination structure.

The gap between structures 104, 106 comprises a first layer of electrically controllable birefringent material 105, such as a liquid crystal material with ordinary and extraordinary refractive indices. Typically the first and second optical structures will be formed in isotropic materials with refractive indices substantially the same as one of the ordinary and extraordinary refractive indices, most typically the same as the ordinary refractive index. Alternatively, the refractive indices and/or curvatures (in the case of lenticular lenses) or facet tilt angles (in the case of elongate prism elements) of the first and second optical structures may be different so as to achieve different divergences for the first and second surfaces.

The surface profile of the respective surfaces of the first layer of electrically controllable birefringent material 105 is defined at least in part by the first and second lenticular optical structures 104, 106. There may be small differences in the structures, for example due to coating layers such as electrodes, alignment layers and barrier layers. The birefringent material is electrically controllable and may have positive dielectric anisotropy such that the molecules have a substantially homeotropic alignment on application of a sufficient electric field and relax to a homogeneous alignment when no electric field is present. Typically, the birefringence of the material itself is not modified by applying an electric field, but the director orientation (the direction of preferred orientation) of the birefringent material is electrically controllable. Incident light of a first polarization thus sees a different refractive index in the birefringent material, dependent on the director orientation of the birefringent material. Thus the optical properties of the material and in particular the optical path difference for light of a given polarization state can be controlled by controlling the birefringent material, in particular the director orientation of the birefringent material.

Each optical structure has a homogeneous alignment layer (which may for example be formed by a rubbed polyimide layer) formed on its surface. The alignment layer provides alignment direction 114 of the birefringent material director at the first surface of the first optical structure and alignment direction 115 of the birefringent material director at the first surface of the second optical structure. The director will typically have some pretilt so that it is not in the plane of the surfaces of the plurality of elongate elements of the respective optical structures. However, the director has a component parallel to orientation of the geometric axes of the respective elongate elements and thus may be considered as substantially parallel to the orientation of the geometric axes of the respective elongate elements.

In an unswitched state, the material 105 adopts a substantially homogeneous alignment with the liquid crystal director orientation determined by alignment layers on the surfaces of structures 104, 106. Advantageously the alignment direction 114 is parallel to the geometric axes of the lenticular element. This achieves optimized quality of alignment at the surface, so that liquid crystal disclinations within the structure are minimized. This increases the optical quality of the output illumination from the device and maximizes the divergence angle that can be achieved. Further, the optical power of the structure for a given liquid crystal layer thickness is maximized so that device cost is reduced compared to non-elongate structures.

The structures 104, 106 may be in contact with each other or a small gap may be maintained across the device width so that the input polarization states are correctly guided through the cell across the aperture of each of the plurality of elongate optical elements.

The surface relief of either side of the birefringent layer 105 may be concave as illustrated or convex or a combination. The curvatures of the structures 104, 106 will typically be identical, but can be different in order to modify the final spot shape, for example to achieve more asymmetric directional distributions. Advantageously the two surfaces comprise first and second elongate elements which cooperate to achieve optical power greater than the optical power of a single surface. Advantageously the two elongate elements cooperate to provide control of shape and size of illumination spot that cannot be provided by a single elongate element.

Alternatively, the alignment layer may be homeotropic and the liquid crystal molecules have negative dielectric anisotropy, so that the liquid crystal molecules have homogeneous alignment on the application of an electric field to the device and homeotropic alignment during the relaxed state. Such an arrangement advantageously achieves a non-diffusing mode with zero volts applied.

The typically randomly polarized light falling on the structure 104 can be resolved into orthogonal polarization states 116, 126 where polarization state 116 is horizontal and parallel to the geometric axes of lenticular elements on the surface of structure 104 and alignment direction 114 while polarization state 126 is vertical. This polarization state 116 sees an index step at the surface of the interface of the structure 104 and birefringent material 105 so that the optical structure has optical power and the directional distribution is modified. In particular, the divergence angle of the beam is increased. The orthogonal polarization 126 sees the ordinary refractive index of the liquid crystal material 105 which is substantially matched to the refractive index of the material forming the structure 104 and so the surface has no optical power for light of polarization 126.

The orientation of the geometric axes of the lenticular elements on the surface of structure 106 is typically aligned at an angle to the orientation of the geometric axes of the lenticular elements on the surface of structure 104. Alternatively, the elements 111 may be parallel to elements 103. The alignment of liquid crystal material at structure 106 causes the liquid crystal director to twist through the cell and guides the polarization state 116 through substantially the same angle. Thus the polarization state 118 at the lenticular surface of structure 104 is rotated to polarization state 120 at surface 106. Thus, the input polarization state 116 has optical power imparted by the first birefringent elongate element stack 104, 105,106. The orthogonal input polarization state 116 has states 128,130 so that no optical power is imparted by the birefringent elongate element stack 104,105,106.

The twist angle within the birefringent stack 104,105, 106 and thus twist in the director of the electrically controllable birefringent material may for example be 0 degrees, 45 degrees, 60 degrees or 75 degrees. A lower twist will increase the maximum divergence angle of the beam, but will also increase the anisotropy of the spot shape for a single polarization state. Advantageously, a twist angle different from 90 degrees minimizes the degradation of alignment from twist degeneracy within the birefringent cells. Thus, the disclinations within the birefringent cells are reduced. Advantageously the two birefringent optical structures (comprising two pluralities of elongate elements) cooperate so that the divergence angle of the light beam 102 is increased for one of the input polarization states by both optical structures, for a randomly polarized source; providing 50% of the light with increased divergence angle. Further a non-zero twist angle advantageously provides a more circularly symmetric illumination spot of greater size compared to that provided by a single plurality of elongate elements.

This embodiment comprises at least first and second elongate structures that both operate on light of a first polarization state. This provides advantages singly or in combination of high divergence, increased illumination spot symmetry, illuminance uniformity and chromatic uniformity. For example, two elongate surfaces with surface tilts inclined at angles of up to 45 degrees compared to the nominal propagation direction and between materials of refractive indices 1.53 and 1.80 is capable of achieving a deflection of a single light ray of up to approximately 28 degrees. By arranging a twist between the geometric axes of the first and second elongate elements, the symmetry, uniformity and chromatic uniformity of the output light can be increased.

By way of comparison with the present embodiments, if a switchable liquid crystal lenticular lens of WO98/21620 were combined with a directional light source, the output would be elongate with high asymmetry and would have limited divergence (up to approximately 14 degrees for a single light ray) due to the restricted power that can be achieved by a single surface. Further, the output would show significant color variations across the illumination region. If a switchable landscape/portrait autostereoscopic display of WO2005/006774 were combined with a directional light source then the output would be switchable between first and second outputs but would not have the combined power of two lenticular lens structures. The first and second outputs would have the limited divergence and high asymmetry of the respective single surfaces.

Thus the respective refractive indices of the first optical structure 104, and birefringent material 105 cooperate so that for the incident light of the polarization 116, the divergence angle of the input illumination is increased (comprising an embodiment of the control of the light directional distribution), and the second optical structure 106 and birefringent material 106 cooperate so that for the incident light of the polarization 116 the divergence angle of the input illumination is further increased (comprising an embodiment of the further control of the light directional distribution). Thus the respective refractive indices cooperate to control the light directional distribution for the polarization 116 for both optical structures 104,106. The divergence angle is thus increased by both first and second lenticular lens optical structures 104, 106 in cooperation with birefringent layer 105 for light of the polarization 116.

If the structures 104, 106 are formed in isotropic materials with the same refractive index (for example the same as the ordinary index of the electrically controllable birefringent material) and surface curvature then the increase in divergence angle will be the same for both surfaces, and the total increase in divergence angle will be advantageously up to twice that which can be achieved from a single surface.

Such an arrangement is strongly advantageous for a light directional distributor. Known materials have a maximum birefringence typically of the order of 0.3, and lens structures have a maximum available curvature defined by lens aberrations and total internal reflection effects. Further, the higher the sag of the lens, the greater the amount of birefringent material that must be used and thus the greater the cost. Thus there is a limit on the range of divergence angles that can be achieved by a single surface (which could also be termed beam deflection for elongate prisms). The embodiment of FIG. 5a operates to increase the divergence angle that can be achieved compared to that from a single surface, while achieving a useful illumination spot shape, illumination uniformity and chromatic uniformity as will be described below; and reducing device cost. The key advantages of increased divergence angle are obtained because the refractive indices cooperate to achieve control of the directional distribution for both optical structures in cooperation with the birefringent layer.

Figure 5B:
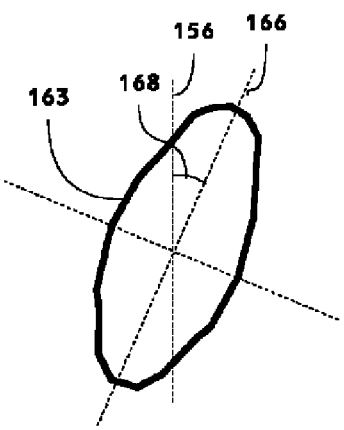

For a circularly symmetric input light beam 102, the final output illumination spot for one polarization state 116, is represented schematically in FIG. 5b. The locus 163 of the spot shape can approximated by combining the unit cell structure defined by the action of the inclined lenses with the divergence angle 136 of the source as described below in FIG. 13b. The locus may be defined as for example the locus of all points with 50% or 95% of the peak energy of the final output spot. The locus 163 of the spot shape is somewhat elliptical. The major axis is parallel to an axis 166 inclined at an angle 168 to the axis 156. The angle 168 is half of the angle between the geometric axes of the lenticular elements on the surface of structures 104, 106. The extent of the illumination structure is determined by the divergence angle of the source light beam 102, the optical power of the structures 104-106 and the angle between the two sets of lenticular lenses. Thus, it is possible to achieve a greater divergence angle than for the embodiment in which the lens axes of structures 104 and 106 are orthogonal. Advantageously the output divergence angle can be increased with conventional materials and surface curvatures.

Electrodes such as transparent electrode layers (not shown) are applied to the optical structures 104 and 106. If a voltage is applied by drivers 144, 146 across the switchable birefringent material 105, then the director orientation is controlled by the electric field as shown in FIG. 6a. The director orientation becomes substantially homeotropic through most of the cell thickness. Thus the electrodes are positioned so as to provide electrical control of the director orientation of the first layer of electrically controllable birefringent material. At the first surfaces of the first and second optical structures 104, 106, the directors typically remain substantially homogeneous with a small pretilt as there is insufficient energy of electric field to overcome the surface forces. Thus the alignment, or orientation, of the birefringent material is modified by the applied electric field. For a light ray of the polarization 116 passing through the elongate elements, the refractive index and thus optical path difference seen is modified by the applied electric field, although the material birefringence does not change. In this embodiment, the incident polarization states 116, 126 both see an index match at each interface so that the elements have substantially no optical power and the spot locus 136 as shown in FIG. 6b is nominally the same as for light beam 102.

The respective refractive indices of the first and second optical structures 104, 106 and layer of electrically controllable birefringent material 105 are such that for incident light of polarization 116 the first optical structure and first layer of electrically controllable birefringent material cooperate to control the light directional distribution to be substantially the same as the input light directional distribution (comprising an embodiment of the control of the light directional distribution) and the second optical structure and first layer of electrically controllable birefringent material cooperate to further control the light directional distribution to be substantially the same as the input light directional distribution (comprising an embodiment of the further control of the light directional distribution). The respective refractive indices of the first and second optical structures 104, 106 and birefringent material 105 also cooperate so that light of polarization 126 is not controlled by either surface. Advantageously such an arrangement achieves a divergence angle of the output beam which is substantially the same as the divergence angle of the input beam for both polarization states, when an electric field is applied to the layer of electrically controllable birefringent material.

The drivers 144, 146 may be controlled by a control system such that the divergence angle of the source may be remotely controlled, for example by a 'dimmer' type switch or by a lighting data bus. Advantageously, a low divergence angle beam can be achieved by applying a voltage across the birefringent layers. Intermediate spot shapes and divergence angles can be achieved by controlling the voltage applied to the cell. In this manner the spot shape can be tuned to meet the requirements of the visual environment.

The apparatus of FIG. 5*a* operates on a single polarization state. Such an apparatus can conveniently modulate the polarization if the light source is polarized, for example using polarized organic electroluminescence or an unpolariszed light source together with a linear polarizer. However, most light sources are unpolariszed or partially polarized (due for example to skew ray polarization effects in reflective optics), so that substantially half of the light will be modulated, while the remainder remains in the low divergence angle light beam, providing an illumination hot spot (a combination of loci 163 and 136). Such an embodiment advantageously has a low cost and allows a wider directional distribution than from the light beam 102.

In one example, the birefringent material may be a liquid crystal material with ordinary refractive index 1.53 and extraordinary refractive index 1.8 and the isotropic material refractive index may be 1.53. Such an arrangement will achieve substantially no modification of the beam divergence angle in the driven mode and may achieve a high divergence angle in the undriven mode. Alternatively the isotropic material refractive index may be 1.50. Such an arrangement will achieve some small diffusion effect in the driven mode, for example to remove sub-structure in the spot shape of the original low divergence angle light beam while providing high divergence angle in the undriven mode. Alternatively one of the isotropic indices may be 1.50 and the other may be 1.53 so as to achieve slightly different levels of diffusion in different directions for both modes. However, the first surface controls the directional distribution and the second surface further controls the directional distribution in each embodiment.

It would be desirable to increase the divergence angle for both polarizations states as will be described in FIG. 7*a* which shows a variable divergence angle illumination device similar to that show in FIG. 5*a* with an additional birefringent elongate element stack. Light from directional light source array 101 (representing schematically light source array 100) with output light beam 102 is incident on the device. Further surface relief structures 108 and 110 are formed in series with structures 104,106 and may be of substantially the same material. The gap between structures 108 and 110 is filled with a birefringent material 109, such as a liquid crystal material. In an unswitched state, the material 109 adopts a homogeneous alignment with the liquid crystal director orientation determined by alignment layers on the surfaces of structures 108, 110. The curvatures of the structures 104, 106, 108 and 110 will typically be identical, but can be different in order to modify the final spot shape accordingly, for example to achieve more asymmetric directional distributions.

The lenticular elongate elements on the surface of structure 108 have geometric axes orthogonal to those of the structure 106. Advantageously, no intermediate waveplate is required at this position in the elongate element stack, reducing thickness and cost. The polarization state 122 (parallel to the output polarization state 120 of the first birefringent elongate element stack 104,105,106) at that surface sees the ordinary refractive index of the birefringent material 109 at the surface of structure 108 and so the surface has no optical power on light of that polarization. The polarization state is guided on the ordinary index of the material 109 and has a polarization state 124 at the surface of structure 110. Thus, the input polarization state 116 has optical power imparted by the first birefringent elongate element stack 104,105,106 and substantially no optical power imparted by the birefringent elongate element stack 108,109,110. The orthogonal input polarization state 116 has states 128,130, 132 and 134 at the structures 104,106,108,110 respectively so that no optical power is imparted by the first birefringent elongate element stack 104, 105,106 and optical power is imparted by the second birefringent elongate element stack 108,109,110. Advantageously the four birefringent lenticular surfaces cooperate so that the divergence angle of the light beam 102 is increased for both polarization states.

For a circularly symmetric light beam 102, the final output illumination structure, representing a modified directional distribution is represented schematically in FIG. 7*b*. For a vertical axis 156, the major axis of one prong is parallel to an axis 166 inclined at an angle 168 to the axis 156. The angle 168 is half of the angle between the geometric axes of the lenticular elements on the surface of structures 104, 106. Similarly, the structures 108,110 have a major axis 170 orthogonal to axis 166. Spot 163 is achieved by the first stack 104, 105, 106 while spot 164 is achieved by the second stack 108,109,110. If the luminance of the two individual spot illuminance distributions is added together, then a spot 165 may be achieved. However, the luminance structure of spot 165 is dominated by the luminance of the area of overlap of spots 163, 164 so that the spot has a smaller visual appearance. For simplicity of explanation, spot diagrams are shown for individual component spots generated by a single stack, rather than the integrated spot structure produced by a combination of stacks, which must be calculated by adding illuminance distributions from each stack for each illuminated point.

FIG. 7*a* further shows an additional waveplate 148 which may be a quarter waveplate so that the respective output linear polarization states 124, 134 are converted to circular polarization states 152, 150 respectively. The diverging beam from the two stacks has different sub-structure for orthogonal polarization states so that if the beam falls onto such a partially polarizing surface, the reflection may be different for different spot shapes, providing undesirable illumination non-uniformities. Advantageously, this waveplate 148 reduces the effect of reflection of polarized light from partially polarizing surfaces, providing a more uniform illumination.

Transparent electrodes (not shown) are applied to the structures 104, 106, 108, 110. If a voltage is applied by means of drivers 144, 146 across the switchable birefringent materials 105 and 109, then the directors reorient as shown in FIG. 7*c* to become substantially homeotropic through the cell thickness. In this embodiment, the incident polarization states 116, 126 see an index match at each interface so that the elements have substantially no optical power and the spot locus 136 as shown in FIG. 6b is nominally the same as for light beam 102, with slight differences due to scatter in the layer, refractive index mismatch between the materials of the birefringent layers and materials of the optical structures and alignment non-uniformities.

The birefringent layers 105,109 may be nematic liquid crystals, or may be liquid crystal gels. In a liquid crystal gel, the nematic material is mixed with a curable material such as an acrylate or a curable liquid crystal. On cure, the material stabilizes the birefringent cell against mechanical shock. The cure may take place when a voltage is applied to stabilize a preferred alignment condition. Further, some additional scatter may be present which increases the divergence angle and improves the rotational symmetry of the output illumination structure.

Figure 8:
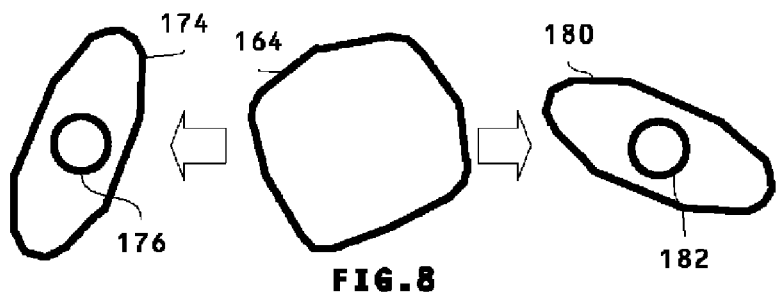
FIG. 8 shows illumination structures that can be achieved with different addressing of birefringent elongate element stacks of FIG. 7c.

The divergence angle of the source can be modified for all input polarization states and the increase in divergence angle can be controlled independently as shown in FIG. 8. With no voltage applied across either cell, the divergence angle has a locus 164. When voltage is applied across the elongate element stack 108,109,110, then the divergence angle locus changes to 174 for one polarization state and 176 for the orthogonal polarization state whereas if the voltage is applied across the elongate element stack 104,105,106 then the divergence angle locus changes to 182 for the first polarization state and 180 for the orthogonal polarization state.

Figure 9A:
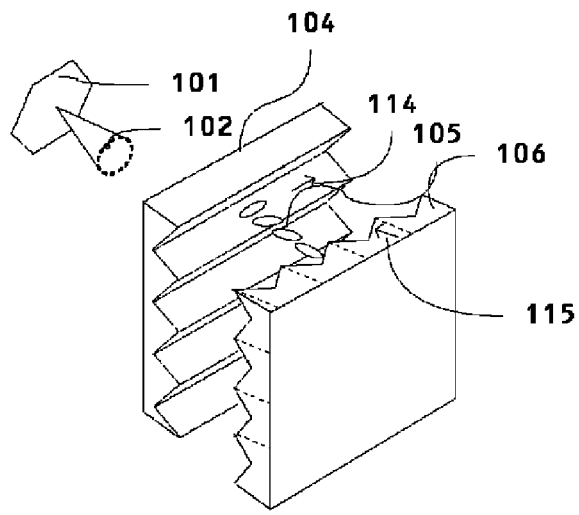
FIG. 9a shows an illumination apparatus comprising a birefringent prism stack.
Figure 9B:
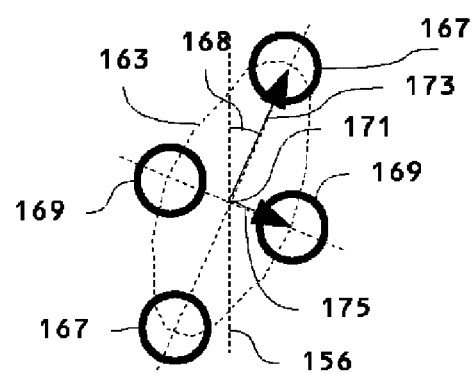

Another embodiment of elongate optical structures is shown in FIG. 9a. This is similar in structure to the controllable light directional distributor of FIG. 5a, wherein the optical structure 104 comprises a plurality of elongate prismatic elements rather than lenticular elements. The prism surfaces serve to deflect rather than focus the input beam. The output spot structure for the structure of FIG. 9a in which the prism arrays in structures 104, 106 are inclined at 45 degrees to each other is shown in FIG. 9b. Spots with loci 167 are located at an angle 168 of 22.5 degrees to the axis 156 with high separation 173 from the unmodified beam axis 171 while spots with loci 169 are located with separation 175 less than separation 173 from the centre of divergence 171 at an angle of 112.5 degrees to the axis 156. The arrangement of FIG. 9a advantageously provides an optical structure with elongate elements that can conveniently achieve a low level of liquid crystal alignment disclinations and thus high optical quality with low scatter. Further, the spots 167 have higher illuminance at a high separation 173 from axis 171 compared to the spot loci 163 for example. In this manner, elongate prisms can advantageously be used to increase the light luminance at high divergence angles compared to lenticular (elongate) lenses.

The elongate prism elements may advantageously have an isosceles cross section so that the deflection of the input beam is equal in both directions, thus maximizing total divergence for minimum aberrations such as chromatic aberrations. Alternatively, the elongate prism elements may have a saw tooth cross section so that one surface can act as a refractive surface and another surface can act with total internal reflection effects. In this manner, the spot shape can be modified. Alternatively the elongate prism elements may have a cross section intermediate to isosceles and saw tooth structures so as to achieve a deflection of the beam axis 171 as well as an increased divergence angle.

By way of comparison, prism arrays used for brightness enhancement films in liquid crystal display (LCD) backlights use total internal reflection to recycle normally incident light beams. The prism structures of the present embodiments achieve substantially refractive deflection of normally incident light directional distributions because the critical angle at the prism surface is significantly higher for typical birefringent-polymer interfaces than for polymer-air interfaces. The elongate prism elements of the present embodiments are therefore different to the prisms of brightness enhancement films.

Figure 10A:
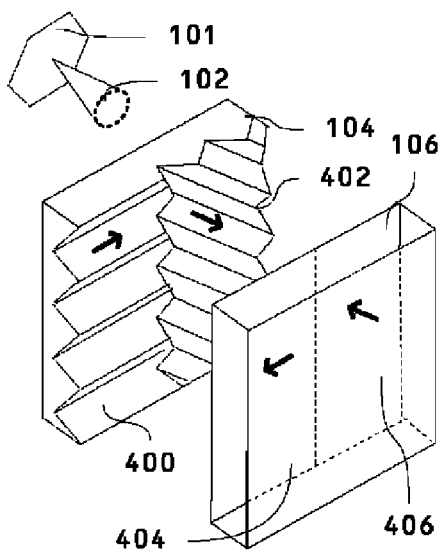
FIG. 10a shows an illumination apparatus comprising a birefringent prism stack.
Figure 10B:
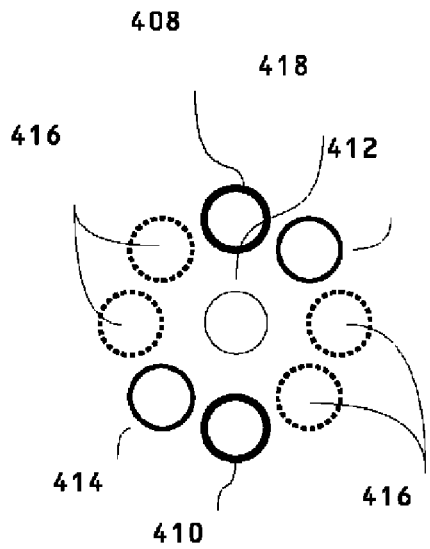

FIG. 10a shows an embodiment of a light direction distributor comprising on a first surface of a first optical structure 104 two separate (substantially coplanar) regions 400, 402 of different elongate prismatic elements with first orientation of 90 degrees to the vertical and second orientation of 45 degree to the vertical. The second optical structure 106 comprises a transparent substrate with a liquid crystal aligning function that may be patterned as indicated into first and second regions 404, 406. Advantageously, the alignment may be anti-parallel across the liquid crystal layer so that both the liquid crystal material has no twist through the layer. Alternatively, the alignment directions of regions 404, 406 can be parallel, reducing the processing complexity. The output of the device of FIG. 10a is shown in FIG. 10b. Illumination spots 408, 410 are produced by region 400 while spots 412, 414 are produced by region 402. Further spots 416 can be produced if a similar second stack of substrates that operates on the orthogonal polarization (in a similar manner shown to that shown for FIG. 7a), is used with geometric axes inclined at angles of 0 degrees and 135 degrees to the vertical. In this manner, a symmetric ring of spots can be produced. Further, if a blank region is incorporated into at least part of the structure (including regions of the light source 100 which have no associated controllable light direction distributor), then a central spot 418 can be incorporated in which the light has not been deflected, so providing a more uniform illumination across the total spot.

In further embodiments, the first optical structure 104 may comprise lenticular elements and the second optical structure may comprise elongate prismatic elements for example, in order to advantageously achieve a mixture between uniform divergence and increased luminance at higher divergence angles. Alternatively, at least one optical structure may comprise regions of lenticular elements and regions of prismatic elements.

Figure 11:
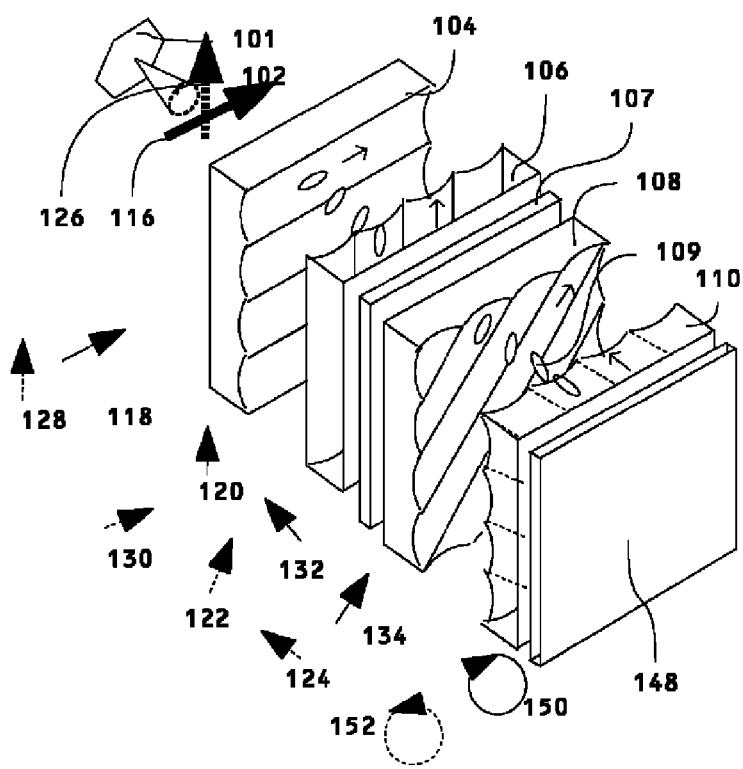
FIG. 11 shows a further illumination apparatus comprising a birefringent elongate element stack.
Figure 12:
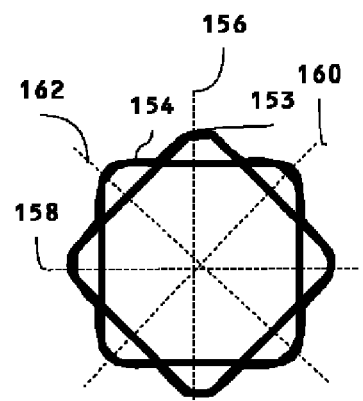
FIG. 12 shows an output illumination structure of FIG. 11.

FIG. 11 shows a further embodiment comprising a pair of birefringent lenticular element stacks in which the orientation of the geometric axes of elongate elements is different for each optical structure in the stack of optical structures. The geometric axes of lenticular elements on the surface of structures 104, 106 are orthogonal and the geometric axes of lenticular elements on the surface of structures 108,110 are also orthogonal, but aligned at 45 degrees to the birefringent elongate element stack 104, 105, 106. An additional polarization rotating element 107 which may be a half waveplate is inserted between the birefringent layers. The waveplate is arranged to rotate the linear input polarization states 120 and 130 so that they are incident orthogonal and parallel respectively to the geometric axes of the lenticular elements on the surface of structure 108. The structure of FIG. 11 achieves the divergence angle loci 153, 154 as shown in FIG. 12 with major divergence angle axis 156 at 0 degrees, 158 at 90 degrees and 160, 162 at +/−45 degrees respectively to the direction of the geometric axes of lenticular elements on the surface of structure 104. Advantageously, this structure has improved rotational symmetry, although the maximum divergence angle achievable is less than that shown in FIG. 7b for example.

The polarization rotating element 107 may be a retarder stack that is further modified to provide a dispersive function so that the polarization output from the waveplate and incident on the second stack 108, 109,110 varies across the visible spectrum. Such an arrangement would provide different spot illuminance structure for each color. In this manner, the chromaticity of the illumination spot can be advantageously adjusted to compensate for refractive index dispersion effects in the first stack.

Figure 13A:
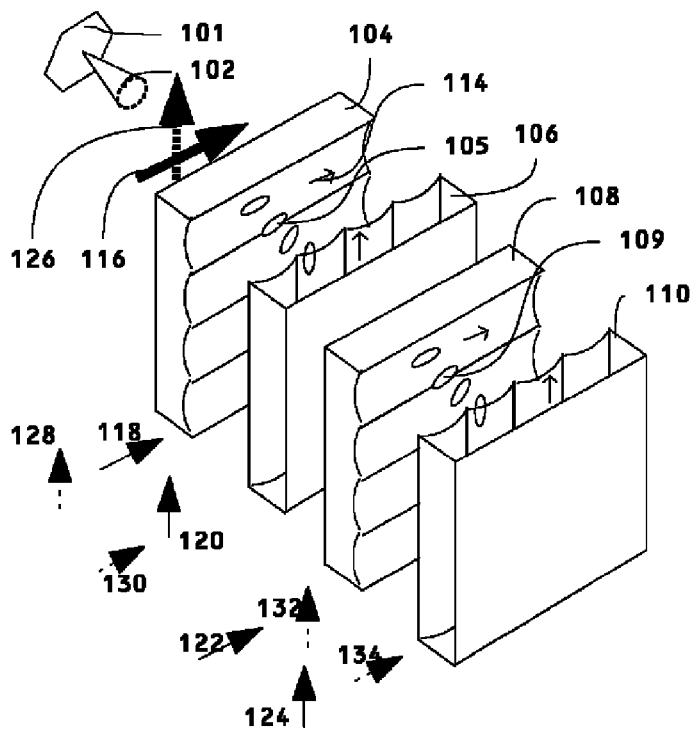
FIG. 13a shows a further illumination apparatus comprising a birefringent elongate element stack.
Figure 13B:
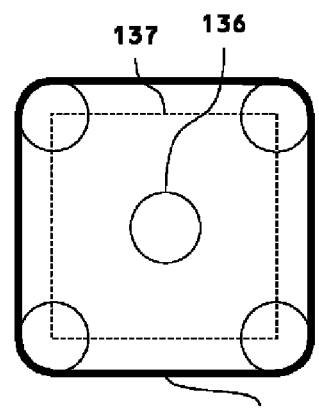
FIG. 13b shows an output illumination structure of FIG. 13.

FIG. 13a shows an arrangement in which the lenticular lens elements of the first substrates of the first and second birefringent stacks are aligned parallel and the lenticular lens elements of the second substrates of the first and second birefringent stacks are aligned parallel. The illumination structure can be derived considering the unit cell divergence angle locus 137 created by imaging a point source by a pair of crossed lenticular elements, combined with the source divergence angle locus 136 to achieve a resultant divergence angle locus 142 as shown in FIG. 13b with lower maximum divergence angle than achievable in FIG. 7b for example. This arrangement would use a thicker lens to provide the same divergence angle as the previous embodiments and may thus have a higher cost. Further, the geometric axes are the same for adjacent elongate element stacks so that if there is any depolarization in the birefringent layers, Moiré fringes may be created due to vignetting effects, degrading the far field appearance.

The material of optical structure 104 may be isotropic with a refractive index matched to one of the indices of the liquid crystal material. Typical isotropic materials have significantly lower refractive index dispersion compared to typical liquid crystal materials and show chromatic dispersion artifacts of the output illumination. The material of optical structure 104 may alternatively be an aligned birefringent material as shown in FIG. 14, for example a cured liquid crystal polymer. For example, the structure 104 may be formed from a cured liquid crystal material 404 have a director parallel to the orientation of the geometric axes of elongate elements, and the structures 106,108, 110 may also be formed from cured liquid crystal material 406, 408, 410 respectively. In other arrangements, the polarization rotation element 107 may be omitted and the structures 106, 108 may have orthogonal geometric axes. The materials 404, 406 may have a dispersion which is matched to the dispersion of the liquid crystal material 105 so as to achieve increased divergence angle across the spectrum of the device, reducing chromatic dispersion artifacts. Advantageously increased beam angles can be achieved with reduced coloration of output compared to typical isotropic material embodiments.

Both incident polarizations 116, 126 have matched refractive indices across the surface relief interfaces when no voltage is applied to the cell, such that the element does not increase the divergence angle of the incident beam. When a voltage is applied the switchable liquid crystal material reorients as shown by the director orientations of materials 105, 109 so that an index step is seen for light of polarization 116 at structure 104. Light of this polarization state 116 is index matched at the interface with structures 106 and 108 and sees an index step at structure 110. Similarly, light of polarization 126 is index matched at structures 104 and 110 and sees an index step at structures 106 and 108. Such a structure is substantially transparent when no voltage is applied so that the input divergence angle is unmodified which may advantageously reduce power consumption if a default setting with no beam shape modification is required. Advantageously this element may not use an additional alignment layer on the surface of the structures 104, 106, 108, 110 as the alignment of the liquid crystal 105, 109 may be achieved by the aligned dipoles of liquid crystal materials 404, 406, 408, 410 respectively.

Further embodiments are provided to enhance spot rotational symmetry using patterned regions of switchable elongate optical elements. Such an arrangement is indicated in FIG. 15a. A catadioptric element 138 has an array of birefringent elongate element stacks in regions 184, 186, 188, 190 positioned across its aperture. Each birefringent elongate element stack has an orientation 185 of geometric axes on the output elongate elements. The elongate element stacks achieve illumination structures 192, 194, 196, 198 respectively, each with a different tilt angle. The orientation of one of the elongate elements (in this embodiment comprising lenticular elements) is shown for each region, although typically there will be multiple elongate element orientations within each elongate element stack.

FIG. 15b shows the arrangement of orientations 187 of the geometric axes of lenticular elements within the respective birefringent elongate element stacks for each region 184, 186, 188, 190 such that each optical structure has the same relative angular alignment of geometric axes across respective regions of the optical structure. In one embodiment, region 184 for structure 104 may have elongate element geometric axes orientations 0 degrees while regions 186, 188, 190 may have orientations 22.5, 45, 67.5 degrees respectively. In structure 106, the orientations are (in degrees) 45, 67.5, 90, 112.5 respectively, while the orientations in structure 108 are (in degrees) 135, 157.5, 180, 202.5 and the orientations in structure 110 are (in degrees) 180, 202.5, 225 and 247.5 respectively.

In FIG. 15b, there is a twist within each birefringent elongate element stack whereas in FIG. 15c, the elongate elements are shown as parallel within each birefringent elongate element stack. In this embodiment, the orientations in regions 184, 186, 188, 190 of structures 104, 106 are (in degrees) 0, 22.5, 45, 67.5 while in structures 108, 110 the orientation are 90, 112.5, 135, 157.5 degrees respectively. Such an embodiment advantageously has a large divergence angle as each of the elongate elements diverges about the same axis. The uniformity of the spot shape is achieved by the different elongate element orientations within each region. Thus, a high divergence angle can be achieved with a substantially uniform output illumination structure. In this embodiment, each elongate element stack has the same sequence of rotations within a region of the elongate element stack. In other embodiments, the sequence of rotations may be different between the elongate element stacks. Such arrangements may also use elongate prismatic elements, or combinations of lenticular lens and prismatic elements.

FIG. 15d shows for the example of a single structure 104, that the array of regions can be arranged within a circular area, aligned to the catadioptric array. Such a circular cell may be useful for integration with circular shaped catadioptric arrays. FIG. 15e shows an example in which the regions of optical structure have annular structure. Three different regions with respective orientations geometric axes of elongate elements are shown within the optical structure. Other configurations of regions are possible, as is the number of regions. For example, each structure may have two regions, so that each elongate element stack provides two of the loci orientations.

In FIG. 16a the array of birefringent elongate element stacks are positioned across a light source array 100. Further, the optical structures and birefringent layers produce optical outputs 192, 194, 196, 198 that are different. For example region 184 may comprise orthogonal elongate prism elements, region 186 may comprise two pairs of inclined lenticular lens elements, area 188 may have no elongate elements (so to produce an unmodified spot) and region 190 may comprise inclined elongate prism elements. The resulting structure comprises a luminance addition of the individual structures which can advantageously achieve a spot structure that can be more accurately defined than that can be achieved by a single stack. The relative energy of each distribution is controlled by setting the relative optical power in each of the regions 184, 186, 188, 190 by means of a controller 203 that adjusts the voltage across the stacks in each region independently.

FIG. 16b shows a further embodiment wherein each catadioptric optical element (such as element 200) of the array 100 is aligned to a region (such as region 201) of controllable light directional distributor array 202. A different control electrode may be associated with each region of the array 202 as well as the light sources associated with the array 100 and a controller 205 controls the light sources and respective regions. The output directional distribution and spot structure can be controlled by switching of both the regions of the array 202 and the light sources associated with the respective catadioptric optical element achieving tunable lighting patterns such as dappled lighting or tunable beam shape. The modified spot shape can thus be set to be different for each light source and respective aligned elongate element stack orientation region. Alternatively, a group of light sources of the array 100 may be aligned with a region of the array 202.

FIG. 16c shows some embodiments of elongate element cross sections. Cross section 204 is an isosceles triangle that advantageously directs light. The tilt angle of the prism may vary across the surface of the plurality of elongate elements, for example with regions 199 and 207 of different prism tilt angle to advantageously provide higher output beam shape uniformity. Cross section 206 is a segmented prismatic structure that will produce two separate deflections of the beam from portions 209, 211 of prism surface. Cross section 207 is a saw tooth structure which may produce light with substantially a single deflection angle. Disadvantageously total internal reflection with the substantially vertical facets may produce unwanted stray light. Cross section 195 shows that further plane portions 197 that are orthogonal to the input beam may be introduced, to increase the amount of power in the undeflected spot, thus increasing uniformity in the beam centre. Further, prismatic surfaces can be combined with lenticular lens surfaces. In each embodiment, the relative area of each surface may be adjusted to optimize the resultant illuminance distribution.

FIG. 17a shows one arrangement of spots using a first stack with prism geometric axes inclined at 45 degrees within the stack, producing spots 208 and a second stack with prism geometric inclined at 45 degrees within the stack, orthogonal to the first stack, producing spots 209. In FIG. 17b further regions are introduced using prisms with geometric axes crossed at 90 degrees to produce spots 210 and using a region with no elongate structures to produce spot 211. In FIG. 17c, the arrangement of FIG. 17a is supplemented using a lenticular lens stack structure similar to that shown in FIG. 7a.

FIG. 17d shows a further embodiment in which some compensation for chromatic aberration due to material refractive index dispersions in the optical elements is provided. An input spot 213 combined with an elongate prismatic embodiment as described above provides a distribution of spots 217 corresponding to each wavelength. For illustration, red spot 214, green spot 215 and blue spot 216 are shown. Due to the low photopic sensitivity in the blue, such an output will tend to have a yellow visual appearance. A second set of spots 219, 221 from the input spot 213 is then introduced from a different plurality of elongate optical elements, in a manner such that the spots 214, 215, 216 are superimposed on spots 219. This addition is illustrated by arrow 223; in fact the spots are in overlapping spatial positions. The blue spot 216 may fall on the green and red regions of the spots 219, adjusting the perceived color. Thus, the color uniformity of the final output may be somewhat improved. Similarly spots 217 overlay spots 221. In this manner, the arrangements of for example FIGS. 17a and 17b can be used to improve the chromatic appearance of the final spot. In each embodiment, the final illumination structure is calculated from the addition of the luminance structure at each point in the total spot from each structure in the light directional distributor. Advantageously the present embodiments provide multiple elongate elements that can provide enhanced chromatic uniformity of the output illumination structure.

For illustrative convenience in FIGS. 18a-b, 19a-f and 20a the elongate elements are shown with parallel geometrical axes of elongate elements whereas the axes are typically inclined at an angle as previously illustrated in FIG. 7a for example. FIG. 18a shows in cross section a single birefringent lenticular element stack and light directing optical element 38, such as that shown in FIG. 5a. Element 38 is attached to a substrate 220 by means of an index matching adhesive (not shown) to minimize reflection losses in the system and increase transmission efficiency. The substrate 220 may be glass or a plastic. If a plastic substrate is used, the birefringence may be relatively low, although not as low as may be required to achieve high contrast in a display apparatus. A transparent conductor layer 224 such as ITO, conductive polymer or graphene is applied to the reverse surface of the substrate 220 which can be connected to a voltage driver 226. A layer of isotropic material is formed on the surface of the ITO layer with a lenticular surface relief structure 236. A further alignment layer 234 which may be a rubbed polyimide layer is formed on the structure 236. Further substrate 218, conductive layer 222, lenticular surface relief structure 228 comprising an isotropic material and alignment layer 230 are aligned at an angle to the first substrate as illustrated for example in FIG. 7a. A birefringent material 232 such as a liquid crystal fills the gap between the lens arrays. The layers 218, 220, 222, 224, 228, 230, 232, 234, 236 and driver 226 together provide a switchable birefringent elongate element stack 238. The structure 104 may comprise layers 220, 224, 236 while the structure 106 may comprise layers 228, 222, 218 for example. The liquid crystal material may be a positive dielectric anisotropy nematic liquid crystal. The extraordinary refractive index may be greater than the isotropic index so that when no voltage is applied the device operates to modify the directional distribution, increasing divergence angle. When the voltage is applied, the device has substantially no function as the liquid crystal index substantially matches the isotropic material index. Such a device has maximum divergence angle when no voltage is applied.

FIG. 18b shows a device with similar structure to FIG. 18a in which the lenticular elements are replace by elongate prism elements. Thus isotropic materials form optical structures 225,227 with surface relief prismatic elongate elements. Thus a switchable birefringent prismatic elongate element stack 239 is provided.

FIG. 19a shows in cross section an embodiment in which a pair of birefringent elongate element stacks 240, 242 are aligned in series with the low divergence angle light source (not shown). In this embodiment, four ITO layers and substrates are used. Such an arrangement can be conveniently manufactured at low cost in two separate layers using manufacturing equipment similar to that used for conventional LCD manufacture, with modifications to compensate for the surface relief structure and nature of isotropic materials. Disadvantageously, the four ITO layers have relatively high absorption, particularly for blue wavelengths which can reduce the color temperature of the device and throughput efficiency.

FIG. 19b shows a similar embodiment to FIG. 19a in which a single voltage driver 250 is arranged to switch the two layers simultaneously. FIG. 19c advantageously shows two birefringent elongate element stacks 244, 246 and a single voltage driver 250 in which the need for two of the ITO layers has been removed. A single intermediate glass substrate 248 with no conductive layers is used. This may use a higher voltage from the single driver 250 than in FIG. 19b to be applied across the pair of birefringent stacks. As shown in FIG. 19d, the intermediate glass substrate 248 may be replaced by a single double-sided polymer element 253. To reduce fabrication steps and cost, the elements 248 and 253 may be inserted into the birefringent cell prior to liquid crystal filling and sealing of substrate 249, 251.

FIG. 19e shows an embodiment of a single birefringent elongate element stack in which for illustrative convenience the alignment layers are removed. The structure 228 has a transparent conductive layer 222 such as ITO formed on its surface relief structure while the structure 236 has the ITO formed between the plane surface and the underlying glass substrate 220. Advantageously this arrangement reduces the total voltage drop across the birefringent elongate element stack while not creating short circuit routes due to the dielectric spacer 236. Alternatively the substrates 228, 236 may be formed from conductive polymer materials with a dielectric formed on their surface to prevent electrical short circuits. Alternatively the ITO may be formed on both surface relief structures with appropriate dielectric barriers or spacers where necessary to prevent electrical short circuits.

FIG. 19f shows a further pair of birefringent stacks arranged in series comprising additional polarization rotation layers 252, 254, 256. Layer 256 may be for example a quarter waveplate. Such an arrangement may improve the uniformity of illumination when the output of the low divergence angle optical element is partially polarized by reflections within the catadioptric element.

FIG. 20a shows an alternative embodiment of a single birefringent stack in which the lenses 228 and 236 are convex (in the isotropic material, concave in the birefringent material). Advantageously, convex surfaces use less switching liquid crystal material than concave surfaces for equivalent sag, and can therefore have lower cost. Further, a spacer element 231 which may be a spacer ball may be inserted between the layers 228, 236 to create a small gap 235 between the plane surfaces of the lenses. The small gap provides a thickness of liquid crystal essentially in the Maugin limit so that guiding takes place across the whole area of the lens. In this way, the input polarization state is rotated across the area of the device.

To minimize the effects of Moiré beating between the elongate elements, the orientation angle between the two structures may be adjusted as appropriate. Mechanical alignment features such as spacer balls, fibers or prisms may be incorporated within the structures or added to the structures so that that the structures can be appropriately aligned without the need for high precision optical alignment. FIG. 20b shows the arrangement of FIG. 20a in plan view (not to scale) of a birefringent stack 233. The spacer elements 231 are formed at the intersection of the cusps 229, 237 of the structures 228, 236 respectively. The spacers may be applied prior to the time of alignment by means of a spacer ball machine, or may be incorporated into the replicated structures at mastering stage.

Figure 21:
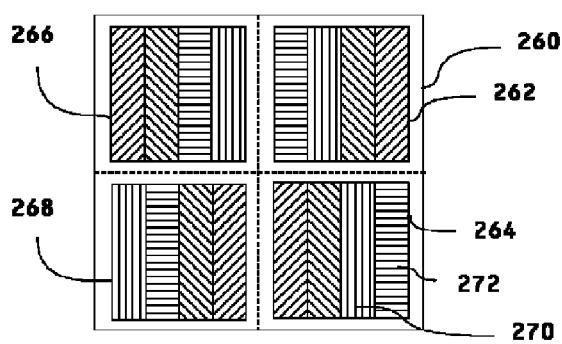
FIG. 21 shows an arrangement of elongate elements on a motherglass substrate.

FIG. 21 shows an embodiment to provide the different geometric axes orientation arrangements of FIGS. 15 and 16, reducing device cost and complexity as well as increasing optical aperture and therefore throughput. A motherglass substrate 260 has an array of surface relief structures formed on its surface, for example by means of UV casting, embossing or other known replication techniques. Substrate 260 comprises an embodiment of an optical structure for use as the first or second optical structure of the controllable light directional distributor of above embodiments comprising at least a first region with a first orientation of geometric axes of elongate elements and at least a second region with a second orientation of geometric axes of elongate elements, different from the first orientation.

Figure 22:
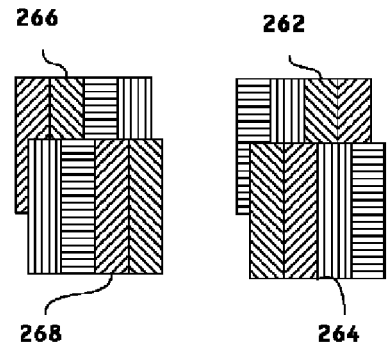
FIG. 22 shows the arrangement of elongate elements after cutting.

Such arrays can be mastered for example by diamond tooling, melted photoresist or sculpted photoresist. Areas 262, 264, 266, 268 of elongate elements on the surface of optical structures are formed each having regions of different elongate element geometrical axes within the areas, for example regions 270, 272. As shown in FIG. 22, after cutting of the substrate 260, two pairs of substrates can be formed for use in the first and second birefringent elongate element stacks. Thus area 266 aligns with area 268 and area 262 aligns with area 264.

Figure 23A:
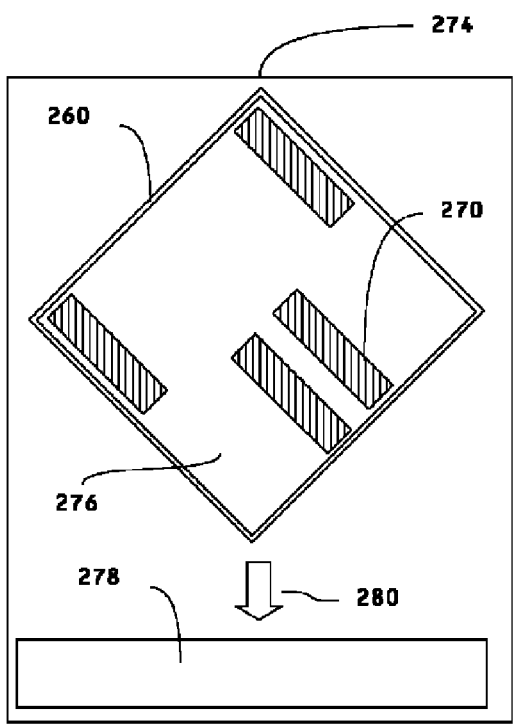
FIG. 23a shows in plan view a first rubbing arrangement for the motherglass of FIG. 21.
Figure 23B:
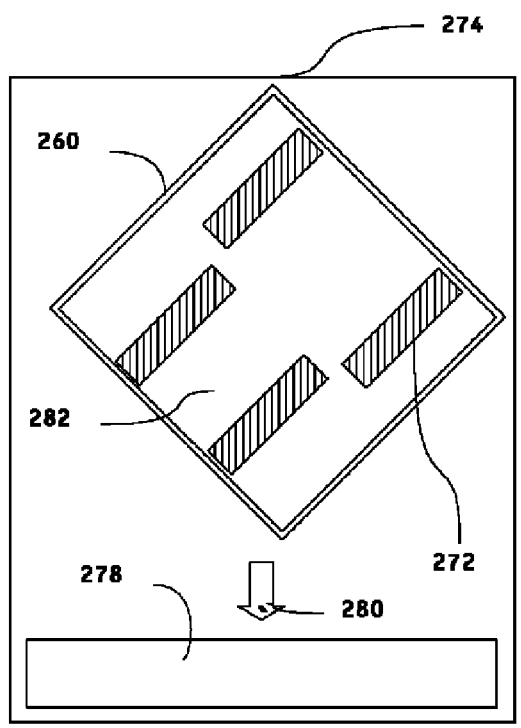
FIG. 23b shows in plan view a further rubbing arrangement for the motherglass of FIG. 21.

Such structures have an alignment orientation within each region matched to the respective elongate element orientation. The structure of FIG. 21 can conveniently be coated with a suitable alignment layer material such as polyimide using spinning or printing techniques. In FIG. 23a, in plan view, a surface 274 has the substrate 260 placed on it. A further stencil mask 276, which may for example be a metal mask, is aligned to the substrate so that only the regions 270 are uncovered. A rubbing cloth mounted on a roller 278 is applied to the surface by moving the substrate in direction 280. After rubbing, as shown in FIG. 23b, a second mask 282 is applied which exposes regions 272 and the process is repeated. Advantageously, the mask 282 will degrade the alignment performance only in the region of the cusps of regions 270 so that the degradation from multi-rubbing can be minimized. In this manner, each region of the mask can be rubbed in a direction parallel to the respective elongate element orientations. Thus multiple regions of different elongate element orientations with correct alignment orientations can be achieved.

Alternatively the mask 276 could be formed from a photoresist material. Linearly photo-polymerisable polymer could also be considered in place of polyimide in which alignment is achieved by means of illumination with linear polarized light during cure of the alignment layer. Alternatively diffractive alignment structures can be incorporated into the replicated structure to provide liquid crystal alignment function. Such arrangements can conveniently used to provide different alignment in different regions using an optical mask rather than a mask 276.

Figure 24:
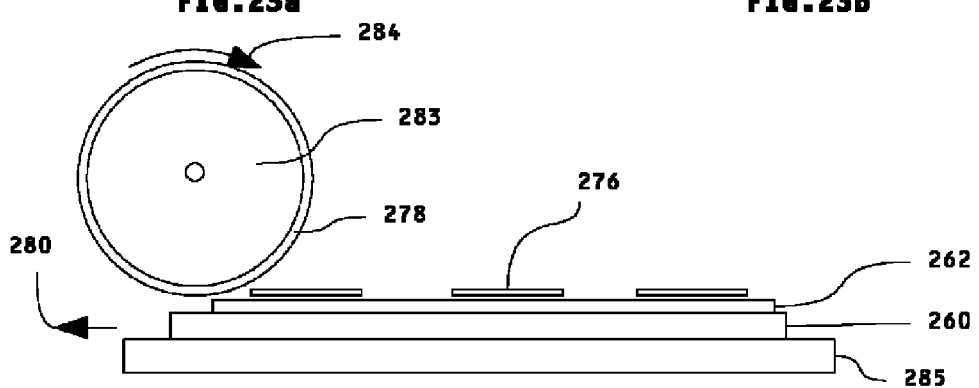
FIG. 24 shows in cross section a rubbing arrangement for the motherglass of FIG. 23.

FIG. 24 shows the rubbing method in cross section. The rubbing roller 283 has a rubbing cloth 278 attached to its outer surface and rotates in direction 284. The mask 276 protects the alignment layer in regions other than those being rubbed. The structure is supported on a table 285.

Figure 25:
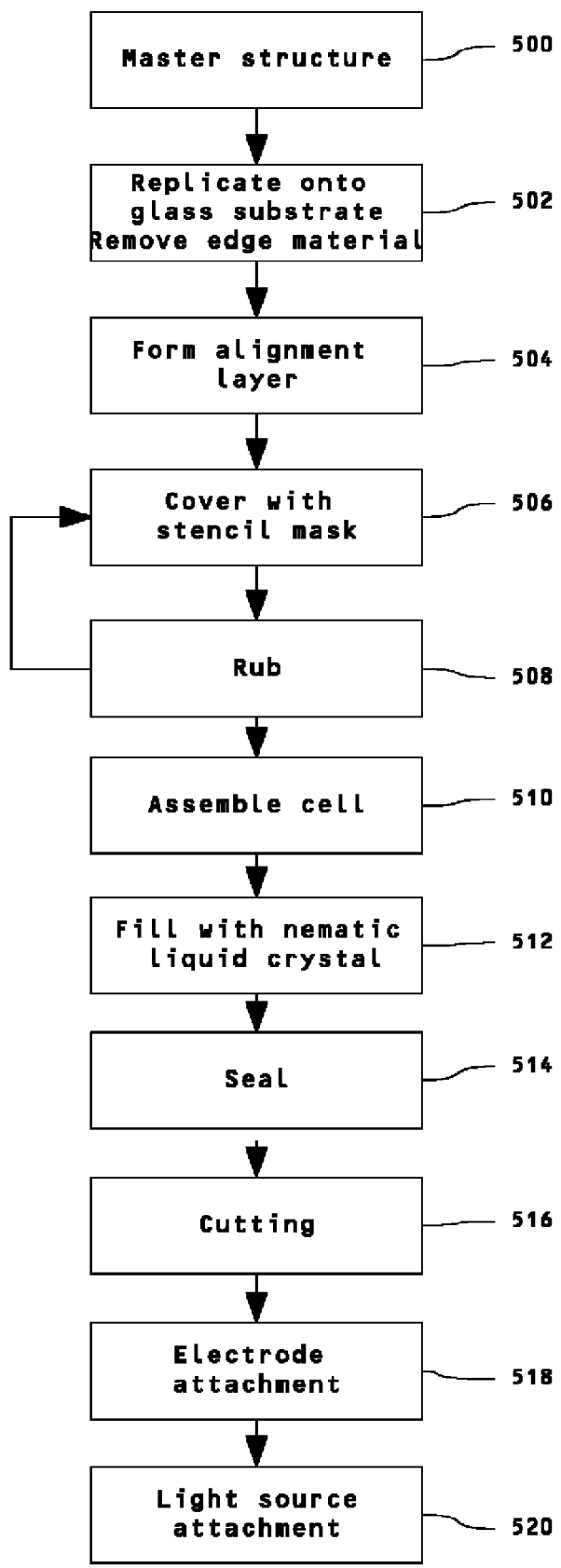
FIG. 25 shows a method to fabricate the birefringent elongate element stacks.

FIG. 25 shows an embodiment of the method to form the birefringent elongate element stack embodiments. A mastering step 500 is used to form the optical structures. In step 502 the elements are replicated into an isotropic material onto a large motherglass substrate, for example as shown in FIG. 21.

Where appropriate, edge material is removed, for example by UV laser. In step 504, alignment layers are formed on the isotropic material, for example by printing of polyimide using flexographic printing method. The alignment layer is then cured by heating. In step 506, the appropriate areas are covered with a stencil mask and rubbed; the process repeated for the different elongate element orientations. In step 510, the isotropic substrates are assembled and the periphery glued. The cells are then filled with liquid crystal in step 512, for example by vacuum filling. In an alternative embodiment, a 'one drop fill' process may be used for cell assembly. The cells are then sealed in step 514 and cut in step 516. The shape of the cells may be arranged to fit conveniently with a luminaire structure, for example square, hexagonal or round. Electrodes are attached to the transparent conductor electrode layers in step 518, and the elements attached to the light source in step 520.

Figures 26, 27:
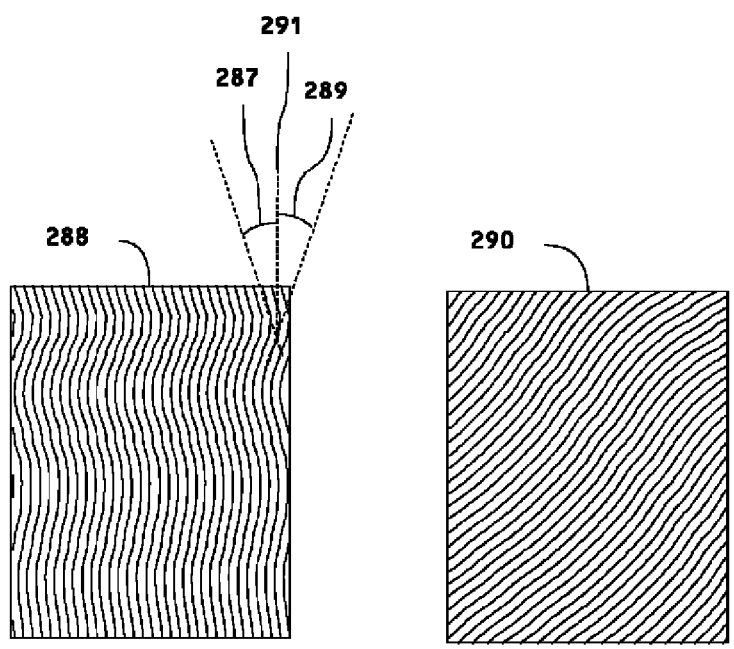
FIG. 26 shows elongate elements in which the axes of the elongate elements are arranged to vary over the area of the optical structure.
FIG. 27 shows the arrangement of FIG. 26 in which the nominal orientation has been adjusted.

FIGS. 26 and 27 show schematically in plan view further embodiments of optical structures for a birefringent elongate element stack in which the elongate elements have substantially a single geometric axes orientation, with minor lateral modifications of elongate element direction. The elongate elements have a nominal direction 291 and maximum deviations of 287 and 289 about the nominal direction 291. Thus the geometric axis orientation of each of the elongate elements may vary by up to +/−22.5 degrees along its length.

Figure 28:
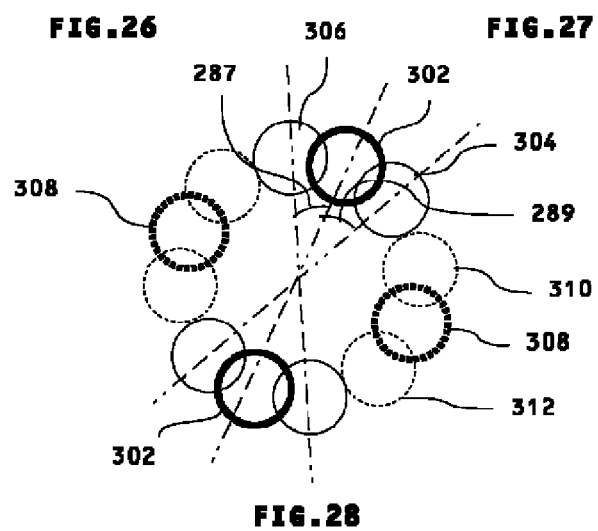
FIG. 28 shows the directional distribution from the arrangement of FIG. 26 and FIG. 27.

Advantageously, if the maximum of deviations 287, 289 is 22.5 degrees then the orientation of the output patterns will fill the divergence angle minima between the respective direction distributions for orthogonally oriented birefringent stacks, as illustrated for prismatic elongate elements in FIG. 28. Structure 288 may produce nominal spots 302 with deflection of geometric axes also producing spots rotated as far as spots 304, 306 at an angle of up to +/−22.5 degrees. Similarly structure 290 may produce nominal spots 308 with further spots rotated as far as spots 310, 312. Such an arrangement can produce a high deflection angle with high uniformity with reduced patterning of the optical structure, advantageously reducing cost.

Figure 29:
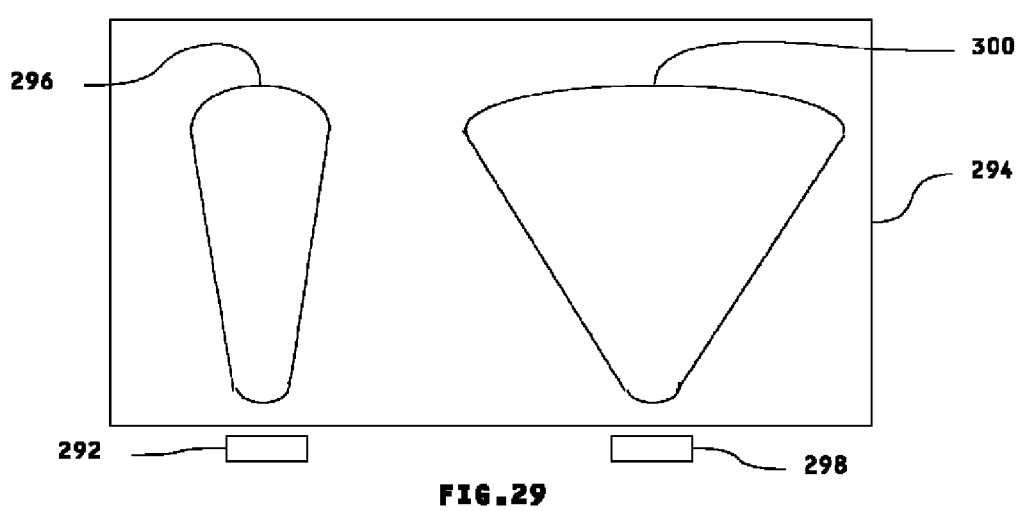
FIG. 29 shows a switchable illumination apparatus used as a wall washer.

FIG. 29 shows an example of application of the lighting apparatus. Switchable divergence illumination apparatus 292 and 298 are positioned against a wall 294, arranged to act as wall washing, or wall grazing illumination apparatus. If no voltage is applied to apparatus 298, the respective controllable light directional distributor may act as a diffuser to increase beam size, and the illumination structure 300 is achieved. Such an illumination may be appropriate for example for daytime operation. The arrangement may be changed to the illumination structure 296 by applying a voltage to the controllable light directional distributor of the illumination apparatus 292.

The optical structures may show chromatic aberration effects due to refractive index dispersion, in which the angle of divergence angle is different for different colors. In luminaires comprising arrays of separate red, green and blue emitters, the voltage applied to the respective regions of the birefringent layer for each emitter may be adjusted so that the divergence angle is substantially matched for each of the colors. In this manner, the visibility of chromatic dispersion in the output is minimized. Alternatively the curvature of the surface can be adjusted to be different for each color to provide substantially the same divergence angle.

The controllable light directional distributor may also be used for automotive applications. In one state of operation, the distributor may be arranged to achieve a main beam illumination. The elongate elements may be arranged with the appropriate structure so as to achieve a non-symmetric output, for example by arranging the respective elongate element geometric axes to achieve the appropriate spot shape. In another state of operation, the light directional distributor may be arranged to be substantially transparent so as to achieve a dipped beam with greater directionality. In this manner, the headlight arrangement of the vehicle may be advantageously reduced in cost as the same bulb and reflector is used for both main and dip beams. Alternatively the headlight can be switched between a day running light with wide directional distribution (high divergence angle) and dipped or main beams with narrower directional distributions (narrow divergence angle).

Figure 30A:
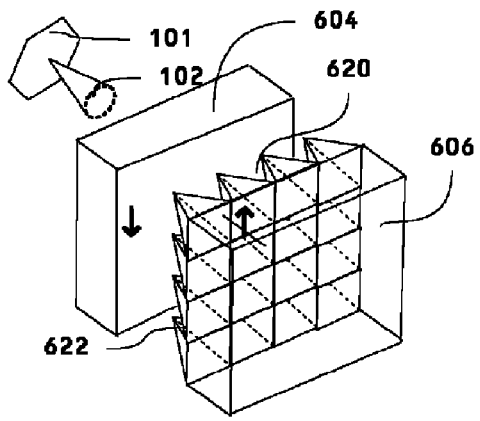
FIG. 30a shows an illumination apparatus comprising a birefringent prism stack.

FIG. 30a shows an apparatus in which non-elongate prismatic elements are formed on a single optical structure 606, together with a plane transparent substrate 604. Such a structure has vertical grooves 620 and horizontal grooves 622. An alignment layer may be formed on the first surface of each optical structure 604, 606 with respective anti-parallel alignment direction. In the vertical grooves 620 of the prismatic elements of optical structure 106, the alignment direction is parallel to the grooves. Advantageously such surfaces can be conveniently rubbed in at least one of the groove directions for each surface, and thus may be capable of achieving reasonable alignment quality in at least one axis with reduced level of disclinations in comparison to non-elongate structures with no continuous grooves in at least one direction.

Figure 30B:
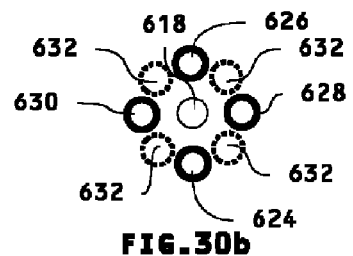

The output from the device is illustrated in FIG. 30b. First spots 624, 626 are produced by the horizontal grooves 622, and spots 628, 630 are produced by the vertical grooves 620. If a second set of similar optical structures to 604, 606 is arranged in series and arranged for light of the orthogonal polarization and aligned at 45 degrees, further spots 632 can be produced to advantageously provide a more symmetric structure.

Figure 30C:
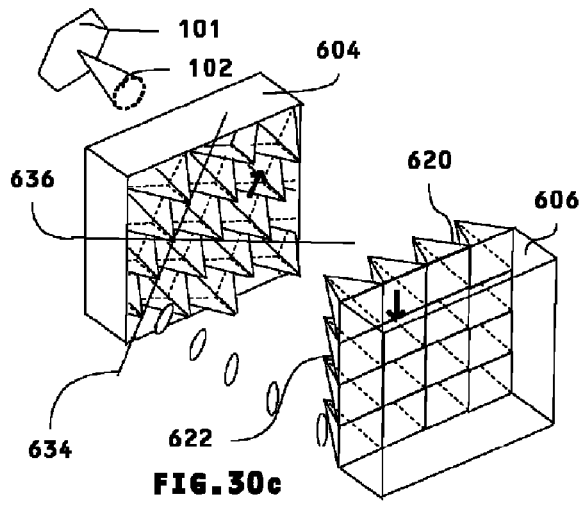
FIG. 30c shows an illumination apparatus comprising a birefringent prism stack.
Figure 30D:
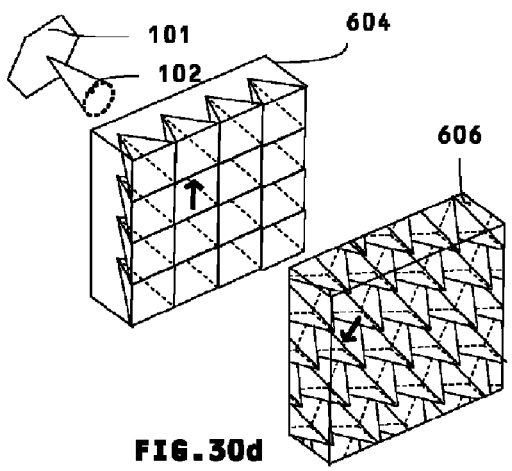
FIG. 30d shows an illumination apparatus comprising a birefringent prism stack.
Figure 30E:
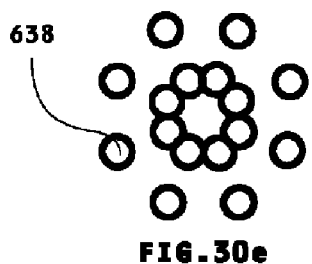
FIG. 30e shows an output illumination structure.

FIG. 30c shows a further directional distributor in which both optical structures 604, 606 comprise non-elongate prismatic elements and are similar to structure 606 of FIG. 30a, but are inclined at 45 degrees to each other. Structure 604 has first and second geometric axes of grooves 634 and 636 that are inclined to the vertical grooves 620 and horizontal grooves 622 of structure 606. FIG. 30d shows an alternative arrangement in which the optical structures 604, 606 comprise pluralities of prismatic elongate elements which are the inverted form of optical structures 606, 604 of FIG. 30c respectively. The structures of FIG. 30c produce substantially the same optical output as shown in FIG. 30e. Advantageously, an array of sixteen spots 638 is produced for a single polarization state from a single liquid crystal layer, advantageously providing high divergence and uniformity.

Figure 30F:
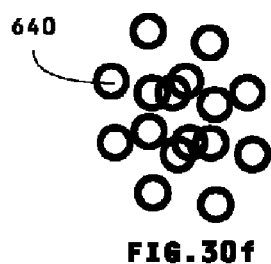
FIG. 30f shows an output illumination structure.
Figure 30G:
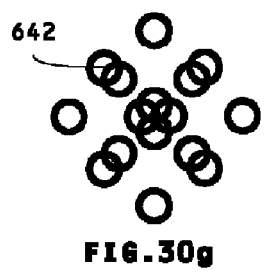
FIG. 30g shows an output illumination structure.

The arrangements of FIGS. 30a, 30c and 30d may have a single alignment layer preferential orientation 614, 615 on each surface. The liquid crystal molecules in the grooves parallel to the respective alignment orientation will be substantially homogeneous so that the light sees substantially the same orientation of liquid crystal molecules across the width of the groove. In regions in which the grooves are at an angle to the alignment orientation, the molecules will be tilted on the surface of the prisms with respect to the incident ray, so the effective index step is reduced and the resultant divergence of these surfaces is reduced. Thus, distorted spot 640 patterns as shown in FIG. 30f may be produced. Advantageously if the elongate elements are horizontal and vertical on each surface and there is a 90 degree twist of alignment orientation in the cell, a more symmetric spot 642 structure as shown in FIG. 30g may be achieved, with higher uniformity and symmetry.

While at least one exemplary embodiment has been presented in the foregoing summary and detailed description, it should be appreciated that a vast number of variations exist. It should be also appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A controllable light directional distributor for an illumination apparatus, comprising:
   a first optical structure comprising a first plurality of elongate elements on a first surface of the first optical structure;
   a second optical structure comprising a second plurality of elongate elements on a first surface of the second optical structure;
   the first optical structure and the second optical structure being positioned in series with the first surface of the first optical structure and the first surface of the second optical structure facing each other;
   a first layer of electrically controllable birefringent material whose director orientation is electrically controllable positioned between the first optical structure and the second optical structure;
   such that a surface profile of a first surface of the first layer of electrically controllable birefringent material is defined at least in part by the surface profile of the elongate elements of the first optical structure and such that a surface profile of a second surface of the first layer of electrically controllable birefringent material is defined at least in part by the surface profile of the elongate elements of the second optical structure;
   a third optical structure comprising a third plurality of elongate elements on a first surface of the third optical structure;
   a fourth optical structure comprising a fourth plurality of elongate elements on a first surface of the fourth optical structure;
   the third optical structure and the fourth optical structure being positioned in series with the first surface of the third optical structure and the first surface of the fourth optical structure facing each other;
   a second layer of electrically controllable birefringent material whose director orientation is electrically controllable positioned between the third optical structure and the fourth optical structure;
   such that a surface profile of a first surface of the second layer of electrically controllable birefringent material is defined at least in part by the surface profile of the elongate elements of the third optical structure and such that a surface profile of a second surface of the second layer of electrically controllable birefringent material is defined at least in part by the surface profile of the elongate elements of the fourth optical structure; and
   electrodes positioned so as to provide electrical control of the director orientation of the first layer of electrically controllable birefringent material;
   wherein the respective refractive indices of the first optical structure, the first layer of electrically controllable birefringent material and the second optical structure are such that for incident light of a first polarization the first optical structure and first layer of electrically controllable birefringent material cooperate to control the light directional distribution; and for incident light of the first polarization the second optical structure and first layer of electrically controllable birefringent material cooperate to further control the light directional distribution, and the third and fourth optical structures are arranged in series with the first and second optical structures.

2. A controllable light directional distributor according to claim 1 wherein the electrically controllable birefringent material is a liquid crystal material with an ordinary refractive index and an extraordinary refractive index; and alignment layers are formed on the respective first surfaces of the first and second optical structures;
   wherein the director orientation of the liquid crystal material is aligned substantially parallel to the orientation of the respective geometric axes of the elongate elements on the first surface of the first optical structure and is aligned substantially parallel to the orientation of the respective geometric axes of the elongate elements on the first surface of the second optical structure.

3. A controllable light directional distributor according to claim 1 wherein the respective refractive indices of the first optical structure and the second optical structure are substantially the same as one of the ordinary and extraordinary refractive indices of the electrically controllable birefringent material.

4. A controllable light directional distributor according to claim 1 wherein the first optical structure and the second optical structure are formed with isotropic material.

5. A controllable light directional distributor according to claim 1 wherein at least one of the first optical structure and the second optical structure is formed with cured liquid crystal material.

6. A controllable light directional distributor according to claim 5 wherein a director of the cured liquid crystal material is aligned substantially parallel to the orientation of the geometric axes of the respective elongate elements.

7. A controllable light directional distributor according to claim 1 wherein the orientations of geometric axes of the respective elongate elements of the respective first and second optical structures are different.

8. A controllable light directional distributor according to claim 1 wherein at least one of the first optical structure or the second optical structure has at least a first region with a first orientation of geometric axes of elongate elements and at least a second region with a second orientation of geometric axes of elongate elements, different from the first orientation.

9. A controllable light directional distributor according to claim 8 wherein first and second optical structures comprise at least first and second regions of geometric axes of elongate elements; and the first region of the first optical structure is aligned to the first region of the second optical structure.

10. A controllable light directional distributor according to claim 8 wherein
    each region of the first optical structure is aligned to each respective region of the second optical structure; wherein
    a difference in orientation of the respective geometric axes of elongate elements of respective first and second optical structures within each respective region is the same for all respective aligned regions of the first and second optical structures.

11. A controllable light directional distributor according to claim 1 further comprising electrodes positioned so as to provide electric control of the director orientation of the second layer of electrically controllable birefringent material.

12. A controllable light directional distributor according to claim 1 wherein the electrodes are electrode layers positioned so as to provide electric control of the director orientation of the first and second layers of electrically controllable birefringent material.

13. A controllable light directional distributor according to claim 1 wherein:
- the second and third optical structures are positioned in series between the first and second layers of electrically controllable birefringent material;
- the second optical structure has at least a first region with a first orientation of geometric axes of respective elongate elements and the third optical structure has at least a first region with a second orientation of geometric axes of respective elongate elements; wherein
- the respective first regions of the second and third optical structures are aligned;
- the respective elongate elements of the second and third optical structures are arranged such that the first orientation of the geometric axes is orthogonal to the second orientation of the geometric axes.

14. A controllable light directional distributor according to claim 1 wherein at least some of the elongate elements comprise prismatic elements.

15. A controllable light directional distributor according to claim 1 wherein at least some of the elongate elements comprise lenticular lens elements.

16. An illumination apparatus comprising a controllable light directional distributor according to claim 1; further comprising at least one light emitting element and an aligned optical element wherein the optical element directs light emitted by the light-emitting element into a smaller solid angle than that at which the light is emitted by the light-emitting element.

17. A method of manufacturing a controllable light directional distributor apparatus for an illumination apparatus according to claim 8; the method comprising the steps of:
- forming at least one optical structure wherein at least two regions of elongate elements are formed on a first surface of the optical structure, each region comprising a different orientation of geometric axes of elongate elements;
- forming an alignment layer on the surface of the optical structures;
- masking the regions so that only regions with a common orientation of geometric axes of elongate elements are not masked;
- rubbing the regions that are not masked in a direction parallel to the orientation of the geometric axes of the elongate elements in the respective region;
- repeating the masking and rubbing wherein each respective region is rubbed in a direction parallel to the respective geometric axes;
- assembling first and second optical structures such that respective regions are substantially aligned between first and second optical structures;
- filling with liquid crystal material; and
- sealing, cutting and attachment of electrode contacts.

* * * * *